United States Patent
Nakazawa et al.

(10) Patent No.: US 9,931,879 B2
(45) Date of Patent: *Apr. 3, 2018

(54) INK JET RECORDING MEDIUM, METHOD FOR MANUFACTURING SAME, PRINTED MATERIAL, METHOD FOR MANUFACTURING SAME, ORNAMENTAL GLASS, AND ROLL

(71) Applicant: FUJIFILM CORPORATION, Minato-ku, Tokyo (JP)

(72) Inventors: Takahiro Nakazawa, Shizuoka (JP); Takahiro Mizumoto, Shizuoka (JP); Masaki Ito, Shizuoka (JP); Takashi Shimizu, Shizuoka (JP); Yoshiki Sugai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,953

(22) Filed: Feb. 23, 2017

(65) Prior Publication Data

US 2017/0157969 A1 Jun. 8, 2017

Related U.S. Application Data

(63) Continuation of application No. PCT/JP2015/073870, filed on Aug. 25, 2015.

(30) Foreign Application Priority Data

Aug. 29, 2014 (JP) ................. 2014-176548

(51) Int. Cl.
| | | |
|---|---|---|
| *B41M 5/50* | (2006.01) | |
| *B41M 7/00* | (2006.01) | |
| *B41M 5/52* | (2006.01) | |
| *B05D 3/06* | (2006.01) | |
| *B05D 5/04* | (2006.01) | |
| *B32B 27/30* | (2006.01) | |
| *B41M 5/00* | (2006.01) | |
| *C08F 2/44* | (2006.01) | |
| *B41J 11/00* | (2006.01) | |
| *B41J 15/02* | (2006.01) | |
| *C09D 4/00* | (2006.01) | |
| *C09D 4/06* | (2006.01) | |
| *C08F 283/02* | (2006.01) | |
| *C09D 167/00* | (2006.01) | |

(Continued)

(52) U.S. Cl.
CPC .............. *B41M 5/502* (2013.01); *B05D 3/06* (2013.01); *B05D 5/04* (2013.01); *B32B 27/30* (2013.01); *B41J 11/0015* (2013.01); *B41J 15/02* (2013.01); *B41M 5/00* (2013.01); *B41M 5/50* (2013.01); *B41M 5/504* (2013.01); *B41M 5/506* (2013.01); *B41M 5/508* (2013.01); *B41M 5/52* (2013.01); *B41M 5/5209* (2013.01); *B41M 5/5227* (2013.01); *B41M 5/5272* (2013.01); *B41M 5/5281* (2013.01); *B41M 7/00* (2013.01); *C08F 2/44* (2013.01); *C08F 283/02* (2013.01); *C08L 67/00* (2013.01); *C09D 4/00* (2013.01); *C09D 4/06* (2013.01); *C09D 167/00* (2013.01); *C09D 175/00* (2013.01); *C09J 7/0207* (2013.01)

(58) Field of Classification Search
CPC ...... B41M 5/502; B41M 5/504; B41M 5/506; B41M 5/508; B41M 5/5209; B41M 5/5227; B41M 5/5272; B41M 5/5281; B41M 7/00; B05D 3/06
See application file for complete search history.

(56) References Cited

U.S. PATENT DOCUMENTS

2002/0119274 A1* 8/2002 Yang .................... B32B 7/04
    428/40.1
2008/0192102 A1* 8/2008 Leenders ................ B41M 3/14
    347/102

FOREIGN PATENT DOCUMENTS

| JP | 2000-211249 A | 8/2000 |
|---|---|---|
| JP | 2001-232738 A | 8/2001 |

(Continued)

*Primary Examiner* — Betelhem Shewareged
(74) *Attorney, Agent, or Firm* — SOLARIS Intellectual Property Group PLLC

(57) ABSTRACT

An object of the present invention is to provide an ink jet recording medium which exhibits excellent adhesiveness with respect to an ink and has excellent scratch resistance and in which density unevenness at the time of printing is suppressed, a method for manufacturing the ink jet recording medium, a printed material using the ink jet recording medium, a method for manufacturing the printed material, ornamental glass, and a roll.

An ink jet recording medium of the present invention has a support and an ink receiving layer on at least one surface of the support, in which the ink receiving layer is a cured layer of a composition containing a radical polymerizable compound, a polymerization initiator, and a compound represented by Formula C-1.

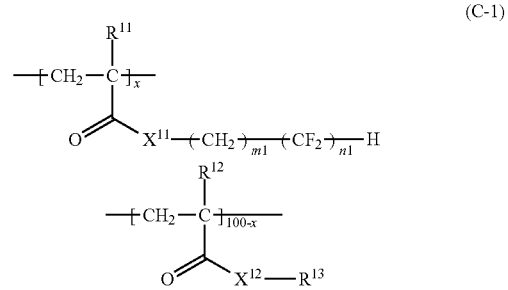

20 Claims, 2 Drawing Sheets

(51) Int. Cl.
*C09D 175/00* (2006.01)
*C09J 7/02* (2006.01)
*C08L 67/00* (2006.01)

(56) References Cited

FOREIGN PATENT DOCUMENTS

| | | |
|---|---|---|
| JP | 2002-011942 A | 1/2002 |
| JP | 2009-545663 A | 12/2009 |
| JP | 2010-047015 A | 3/2010 |

* cited by examiner

INK JET RECORDING MEDIUM, METHOD FOR MANUFACTURING SAME, PRINTED MATERIAL, METHOD FOR MANUFACTURING SAME, ORNAMENTAL GLASS, AND ROLL

CROSS-REFERENCE TO RELATED APPLICATION

This application is a Continuation of PCT International Application No. PCT/JP2015/073870, filed Aug. 25, 2015, which claims priority under 35 U.S.C. § 119(a) to Japanese Patent Application No. 2014-176548 filed Aug. 29, 2014. Each of the above applications is hereby expressly incorporated by reference, in its entirety, into the present application.

BACKGROUND OF THE INVENTION

1. Field of the Invention

The present invention relates to an ink jet recording medium, a method for manufacturing the same, a printed material, a method for manufacturing the same, ornamental glass, and a roll.

2. Description of the Related Art

Ink jet methods in which an ink composition is jetted in the form of droplets from an ink jet port use a small device, are inexpensive, and can form an image on a recording medium in a non-contact manner. Therefore, the ink jet methods are used in many printers. Among the ink jet methods, a piezoelectric ink jet method, in which an ink is jetted by exploiting the deformation of a piezoelectric element, and a thermal ink jet method, in which an ink composition is jetted in the form of droplets by exploiting the boiling phenomenon of the ink composition caused by thermal energy, feature high resolution and excellent high-speed printing properties.

In recent years, not only photo printers or document printers for home use or office use, but also commercial printers or industrial printers using ink jet printers have been developed. Particularly, there is a rapidly increasing demand for a wide format ink jet printer which is suitable for printing a large size advertisement, such as ornamental glass obtained by bonding a printed material, which is formed by printing letters or patterns on an ink jet recording sheet for ornamenting windows, to the glass of a show window or an automatic door, and performs UV irradiation immediately after ink droplets are jetted. The printed material used in the ornamental glass or the ink jet recording sheet for ornamenting windows for forming the printed material is required to have an ink receiving layer that has both of the ink adhesiveness and the scratch resistance.

As the ink used in the wide format ink jet printer, an actinic ray-curable type ink cured by actinic rays (radiation) such as ultraviolet rays is generally used. The ink is classified into a non-aqueous ink containing an organic solvent and a solventless ink not containing an organic solvent. Because the organic solvent dissolves a resin forming the ink receiving layer on the recording sheet, the ink easily dyes the ink receiving layer, and the ink adhesiveness is easily obtained.

However, because of the necessity for a step of volatilizing the organic solvent and the problem of the working environment in which the organic solvent (VOC) is handled, the use of a solventless actinic ray-curable type ink is desired. Because the solventless actinic ray-curable type ink does not dissolve the ink receiving layer, the ink does not easily dye the ink receiving layer. Furthermore, the adhesiveness between the actinic ray-curable type ink and the recording medium needs to be further improved.

For example, JP2001-232738A suggests a method for improving the adhesiveness with respect to a UV-curable type ink by using a recording layer composed of at least one kind of resin selected from polyester, polyurethane, acryl, and polyester urethane resins. JP2002-11942A suggests a method for improving printing properties with respect to a wide format ink jet printer and a pigment (UV) ink by forming an ink receiving layer composed of aqueous polyurethane, a porous pigment, and magnesium chloride. JP2010-47015A suggests a method for improving high water resistance with respect to an organic solvent-containing non-aqueous ink by forming an ink receiving layer formed of a urethane/acryl blend or a blend of two or more kinds of urethane.

JP2009-545663A describes the use of a curable composition, which contains one or more kinds of non-charged curable monomer, one or more kinds of anionic curable monomer, one or more kinds of cationic compound having a molecular weight of equal to or greater than 150 Dalton (Da), and an aqueous solvent, for manufacturing a porous film as an ink receiving layer. JP2000-211249A describes a composition for an actinic energy ray-curable ink jet ink receiving layer containing alkylene oxide-modified polyfunctional (meth)acrylate and a compound containing two or more maleimide structures in a molecule.

SUMMARY OF THE INVENTION

With the ink jet recording media of the related art described in JP2001-232738A, JP2002-11942A, JP2010-47015A, JP2009-545663A, and JP2000-211249A, sufficient ink adhesiveness is still not obtained, and improvement thereof is required. Furthermore, in some cases, ink density unevenness occurs at the time of printing, and hence the improvement thereof is required.

An object of the present invention is to provide an ink jet recording medium which exhibits excellent adhesiveness with respect to an ink and has excellent scratch resistance and in which density unevenness at the time of printing is suppressed. Another object of the present invention is to provide a method for manufacturing an ink jet recording medium, which exhibits excellent adhesiveness with respect to an ink and has excellent scratch resistance and in which density unevenness at the time of printing is suppressed, a printed material using the ink jet recording medium, a method for manufacturing the printed material, ornamental glass, and a roll.

The aforementioned objects of the present invention were achieved by means described in the following <1>, <11>, or <15> to <19>. Preferred embodiments are also described in the following <2> to <10> and <12> to <14>.

<1> An ink jet recording medium comprising a support and an ink receiving layer on at least one surface of the support, in which the ink receiving layer is a cured layer of a composition containing a radical polymerizable compound, a polymerization initiator, and a compound represented by Formula C-1,

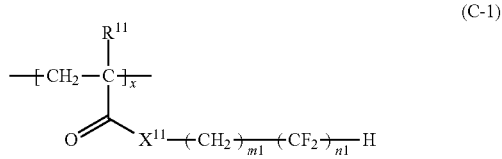

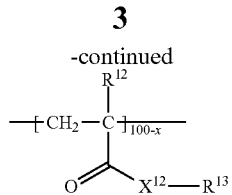

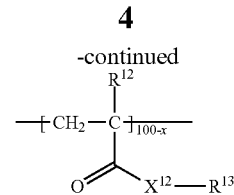

in Formula C-1, $R^{11}$ and $R^{12}$ each independently represent a hydrogen atom or a methyl group, $X^{11}$ and $X^{12}$ each independently represent an oxygen atom, a sulfur atom, or $NR^{14}$, m1 represents an integer of equal to or greater than 1 and equal to or less than 6, n1 represents an integer of equal to or greater than 2 and equal to or less than 20, $R^{13}$ represents a hydrogen atom or an alkyl group having 1 to 30 carbon atoms, $R^{14}$ represents a hydrogen atom or an alkyl group having 1 to 8 carbon atoms, and X represents a molar ratio (%) and is equal to or greater than 20.

<2> The ink jet recording medium described in <1>, further comprising a pressure sensitive adhesive layer on a surface of the support that is opposite to the surface having the ink receiving layer, <3> The ink jet recording medium described in <2>, further comprising a single interlayer or plural interlayers between the support and the pressure sensitive adhesive layer, <4> The ink jet recording medium described in any one of <1> to <3>, further comprising a single interlayer or plural interlayers between the support and the ink receiving layer, <5> The ink jet recording medium described in any one of <1> to <4>, in which the support is a transparent support, <6> The ink jet recording medium described in any one of <1> to <5>, in which the support is a polyethylene terephthalate film, <7> The ink jet recording medium described in any one of <1> to <6>, in which a content of the compound represented by Formula C-1 in the ink receiving layer is 0.0008 to 0.0081 g/m$^2$, <8> The ink jet recording medium described in any one of <1> to <7>, in which a glass transition temperature of the compound represented by Formula C-1 is −50° C. to −10° C., <9> The ink jet recording medium described in any one of <1> to <8>, in which the ink receiving layer is a cured layer obtained by partially curing the composition containing the radical polymerizable compound, the polymerization initiator, and the compound represented by Formula C-1, <10> The ink jet recording medium described in any one of <1> to <9>, in which the polymerization initiator is a photopolymerization initiator, <11> A method for manufacturing an ink jet recording medium, comprising an application step of applying a composition, which contains a radical polymerizable compound, a polymerization initiator, and a compound represented by Formula C-1, to at least one surface of a support, and a curing step of curing the applied composition,

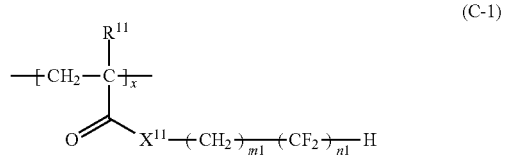

(C-1)

in Formula C-1, $R^{11}$ and $R^{12}$ each independently represent a hydrogen atom or a methyl group, $X^{11}$ and $X^{12}$ each independently represent an oxygen atom, a sulfur atom, or $NR^{14}$, m1 represents an integer of equal to or greater than 1 and equal to or less than 6, n1 represents an integer of equal to or greater than 2 and equal to or less than 20, $R^{13}$ represents a hydrogen atom or an alkyl group having 1 to 20 carbon atoms, $R^{14}$ represents a hydrogen atom or an alkyl group having 1 to 8 carbon atoms, and X represents a molar ratio (%) and is equal to or greater than 20.

<12> The method for manufacturing an ink jet recording medium described in <11>, in which in a winding step in the manufacturing method, a maximum pressure applied to the ink jet recording medium is equal to or less than 0.4 MPa, <13> The method for manufacturing an ink jet recording medium described in <11>, in which in the winding step in the manufacturing method, a maximum pressure applied to the ink jet recording medium is equal to or less than 0.8 MPa, and a winding core further has a layer, which allows the ink jet recording medium to absorb a pressure difference, on a surface thereof, <14> The method for manufacturing an ink jet recording medium described in any one of <11> to <13>, in which the polymerization initiator is a photopolymerization initiator, and the curing step is a step of curing the applied composition by irradiating the composition with ultraviolet rays, <15> An ink jet recording medium obtained by the manufacturing method described in any one of <11> to <14>, <16> A method for manufacturing a printed material, comprising a jetting step of jetting an ink composition onto the ink jet recording medium described in any one of <1> to <10> and <15>, and an image forming step of curing the ink composition by irradiating the jetted ink composition with actinic rays, <17> A printed material obtained by the method for manufacturing a printed material described in <16>, <18> Ornamental glass comprising glass and the printed material described in <17> disposed on the glass, <19> A roll comprising a winding core and the ink jet recording medium described in any one of <1> to <10> and <15> that is wound around the winding core.

According to the present invention, it is possible to provide an ink jet recording medium which exhibits excellent adhesiveness with respect to an ink and has excellent scratch resistance and in which density unevenness at the time of printing is suppressed. Furthermore, according to the present invention, it is possible to provide a method for manufacturing an ink jet recording medium, which exhibits excellent adhesiveness with respect to an ink and has excellent scratch resistance and in which density unevenness at the time of printing is suppressed, a printed material using the ink jet recording medium, a method for manufacturing the printed material, ornamental glass, and a roll.

DESCRIPTION OF THE PREFERRED EMBODIMENTS

Figure 1:
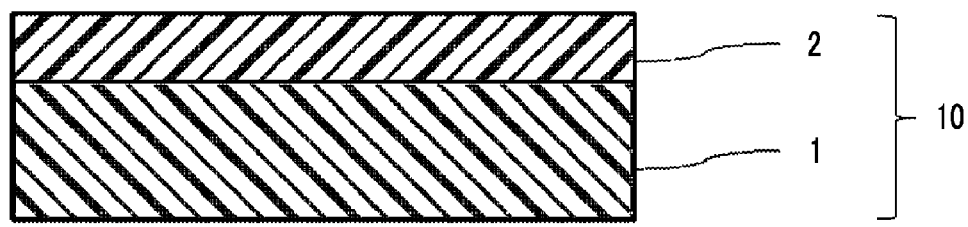
FIG. 1 is a schematic cross-sectional view of an example of an ink jet recording sheet of the present invention.

Hereinafter, the content of the present invention will be specifically described. The following constituents will be described based on typical embodiments of the present invention in some cases, but the present invention is not limited to such embodiments. In the specification of the present application, "to" is used to signify a numerical range that includes numerical values listed before and after "to" as a lower limit and an upper limit respectively.

In the present specification, in a case where there is no description regarding whether a group (atomic group) is substituted or unsubstituted, the group includes both of a group not having a substituent and a group having a substituent. For example, an "alkyl group" includes not only an alkyl group not having a substituent (unsubstituted alkyl group) but also an alkyl group having a substituent (substituted alkyl group).

In the present specification, "(meth)acrylate" represents acrylate and methacrylate, "(meth)acryl" represents acryl and/or methacryl, and "(meth)acryloyl" represents acryloyl and/or methacryloyl.

In the present invention, "% by mass" has the same definition as "% by weight", and "part by mass" has the same definition as "part by weight".

In the present invention, a combination of preferred aspects is a more preferred aspect.

In the present invention, a molecular weight of a polymer component is a weight-average molecular weight which is measured by gel permeation chromatography (GPC) using tetrahydrofuran (THF) as a solvent and expressed in terms of polystyrene.

(Ink Jet Recording Medium)

An ink jet recording medium of the present invention has a support and an ink receiving layer on at least one surface of the support, in which the ink receiving layer is a cured layer of a composition containing a radical polymerizable compound, a polymerization initiator, and a compound represented by Formula C-1.

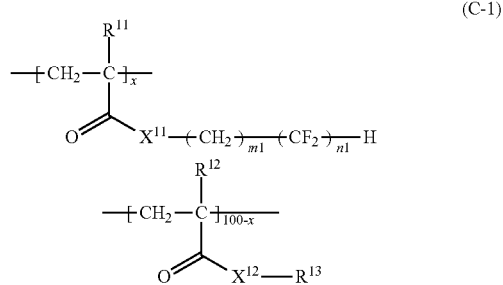

(C-1)

In Formula C-1, $R^{11}$ and $R^{12}$ each independently represent a hydrogen atom or a methyl group, and $X^{12}$ each independently represent an oxygen atom, a sulfur atom, or $NR^{14}$, m1 represents an integer of equal to or greater than 1 and equal to or less than 6, n1 represents an integer of equal to or greater than 2 and equal to or less than 20, $R^{13}$ represents a hydrogen atom or an alkyl group having 1 to 30 carbon atoms, $R^{14}$ represents a hydrogen atom or an alkyl group having 1 to 8 carbon atoms, and X represents molar ratio (%) and is equal to or greater than 20.

In the following description, a composition, which is for forming an ink receiving layer and contains a radical polymerizable compound (hereinafter, referred to as a component A as well), a polymerization initiator (hereinafter, referred to as a component B as well), and a compound represented by Formula C-1 (hereinafter, referred to as a component C as well), will be referred to as a composition for forming an ink receiving layer as well.

As a result of conducting intensive investigation, the inventors of the present invention found that the aforementioned objects are achieved by using a specific surfactant. The mechanism that brings about such an effect is unclear but is assumed to be as below.

In the related art, in order to maintain the viscosity of a composition for forming an ink receiving layer at an appropriate level, a fluorine-based surfactant has been used. It is considered that, because the fluorine-based surfactant easily moves to the surface of the ink receiving layer, and the compatibility between the fluorine-based surfactant having moved to the surface and an ink composition applied to the ink receiving layer is low, sufficient ink adhesiveness is not obtained. In contrast, presumably, because the compound represented by Formula C-1 has a hydrogen atom on a terminal thereof, the compatibility between the compound and the ink composition applied to the ink receiving layer may be higher than the compatibility between the fluorine-based surfactant of the related art and the ink composition, the compound may rapidly move to the ink composition, and hence the adhesiveness between the ink and a support may be improved.

Furthermore, the inventors found that density unevenness at the time of printing is suppressed in the ink jet recording medium of the present invention. Although the mechanism that brings about such an effect is unclear, the inventors obtained the following knowledge.

As a result of conducting intensive investigation regarding the density unevenness at the time of printing, the inventors of the present invention found that the density unevenness at the time of printing markedly occurs particularly in a case where the recording medium is wound in the form of a roll. Furthermore, they found that, in a case where the start of winding of the recording medium is prevented using an adhesive tape or the like in a winding core, a printed portion of the recording medium in an upper portion of the tape becomes a light-colored portion, and the periphery thereof becomes a dark-colored portion. It is considered that while the recording medium in the portion corresponding to the upper portion of the tape is applied with a high pressure compared to other portions, the periphery thereof is applied with a low pressure. Presumably, the pressure difference that occurs in the recording medium as described above may be one of the causes of the density unevenness at the time of printing. Particularly, the inventors paid attention to the fluorine-based surfactant contained in the ink receiving layer, and presumed that, at sites to which a high pressure is applied, the amount of the fluorine-based surfactant on the surface of the ink receiving layer may be reduced due to transfer and hence the ink may not spread widely to a sufficient extent, and accordingly, a light-colored portion may be formed. As a result of using the compound represented by Formula C-1 instead of the fluorine-based surfactant of the related art, the inventors found that the density unevenness at the time of printing is suppressed.

As illustrated in FIG. 1, an ink jet recording medium 10 of the present invention has a support 1 and an ink receiving layer 2 disposed on one surface side of the support 1. The ink receiving layer 2 may be disposed on at least one surface side or both sides of the support 1. From the viewpoint of providing a pressure sensitive adhesive layer which will be described later, it is preferable that the ink receiving layer 2 is disposed only on one side of the support.

Figure 2:
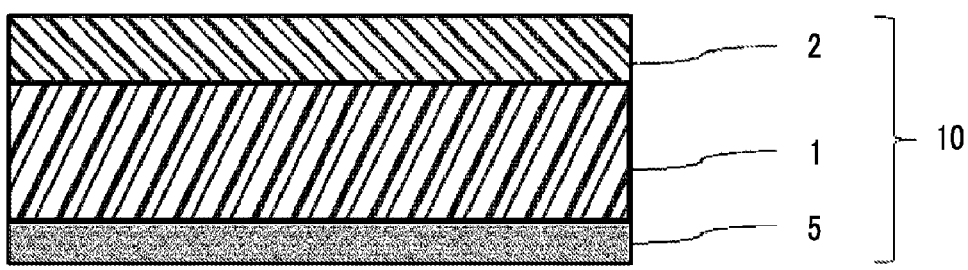
FIG. 2 is a schematic cross-sectional view of another example of the ink jet recording sheet of the present invention.
Figure 3:
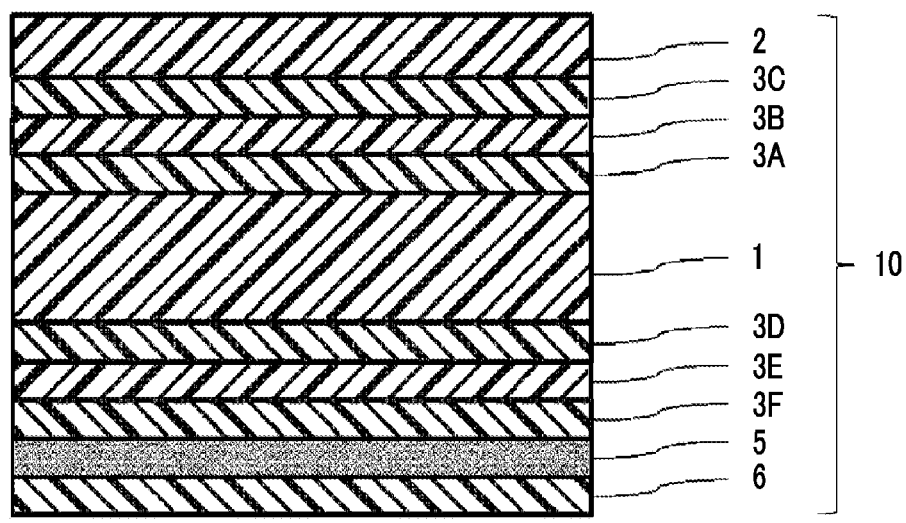
FIG. 3 is a schematic cross-sectional view of another example of the ink jet recording sheet of the present invention.

As illustrated in FIG. 2, it is preferable that the ink jet recording medium 10 of the present invention has a pressure sensitive adhesive layer 5 on a surface side of the support 1 that is opposite to the surface having the ink receiving layer 2. As illustrated in FIG. 3, it is preferable that the ink jet recording medium 10 of the present invention has a release film 6 on the pressure sensitive adhesive layer 5.

As illustrated in FIG. 3, it is preferable that the ink jet recording medium 10 of the present invention has interlayers 3A, 3B, 3C, 3D, 3E, and 3F each of which is in the form of a single layer or plural layers (constituted with two or more layers), at least between the ink receiving layer 2 and the support 1 or between the pressure sensitive adhesive layer 5 and the support 1. FIG. 3 shows an aspect in which three interlayers 3A, 3B, and 3C are disposed in this order from the support 1 side between the ink receiving layer 2 and the support 1 and the three interlayers 3D, 3E, and 3F are disposed in this order from the support 1 side between the pressure sensitive adhesive layer 5 and the support 1. However, the present invention is not limited to the aspect, and the number and order of the interlayers are not particularly limited.

Hereinafter, each member will be described.

<Support>

As a support, a known support can be used. Examples thereof include a plastic film (for example, polyester, polyethylene, polypropylene, polystyrene, a cyclic olefin-based resin, polyvinyl alcohol, polycarbonate, and cellulose ester such as triacetyl cellulose) and the like.

In the present invention, the support is preferably a transparent support, and transparency of the transparent support refers to the properties of exhibiting a total light ray transmittance (total light transmittance) of equal to or greater than 80% with respect to light rays having a wavelength in a range of 380 to 780 nm.

Among the above, a film containing polyester as a main component is preferable as a support, and the support may contain an additive such as a plasticizer. The polyester is not particularly limited, and for example, polyethylene terephthalate, polyethylene naphthalate, polubutylene terephthalate, or polybutylene naphthalate is used. Among these, from the viewpoint of costs and mechanical strength, polyethylene terephthalate is particularly preferable. The main component means a component contained in the support in an amount of equal to or greater than 50% by mass.

From the viewpoint of improving the mechanical strength of the support, a support having undergone a stretching treatment is preferable, and a biaxially stretched support is particularly preferable. The stretching ratio is not particularly limited, but is preferably within a range of equal to or greater than 1.5-fold and equal to or less than 7-fold. If the stretching ratio is equal to or greater than 1.5-fold, the mechanical strength becomes excellent. Inversely, if the stretching ratio is equal to or less than 7-fold, the uniformity of thickness becomes excellent. The stretching ratio is more preferably within a range of equal to or greater than 2-fold and equal to or less than 5-fold. It is particularly preferable that the support is stretched in two directions orthogonal to each other at a stretching ratio within a range of equal to or greater than 2-fold and equal to or less than 5-fold.

A thickness of the support is preferably equal to or greater than 30 μm and equal to or less than 500 μm, and more preferably equal to or greater than 50 μm and equal to or less than 300 μm. If the thickness of the support is equal to or greater than 30 μm, handleability becomes excellent. If the thickness is equal to or less than 500 μm, it is possible to gain advantages in terms of weight lightening and costs.

It is preferable the support has a uniform thickness.

Furthermore, it is preferable to use a support in which at least one surface or the other surface thereof has undergone a surface treatment such as a corona discharge treatment, a vacuum glow discharge treatment, or a flame treatment. Through the surface treatment, one surface and/or the other surface of the support may become hydrophilic, and wettability of various aqueous coating solutions may be improved. In addition, a functional group such as a carboxyl group or a hydroxy group may be introduced into the support. In this way, it is possible to further improve the adhesion between one surface of the support and the ink receiving layer, the pressure sensitive adhesive layer, or the interlayer.

<Ink Receiving Layer>

The ink receiving layer is disposed on at least one surface of the support, and is a cured layer of a composition containing a radical polymerizable compound, a polymerization initiator, and a compound represented by Formula C-1.

Hereinafter, a composition for forming an ink receiving layer that is for forming an ink receiving layer of the ink jet recording medium of the present invention will be described. That is, the composition for forming an ink receiving layer contains a radical polymerizable compound (component A), a polymerization initiator (component B), and a compound represented by Formula C-1 (component C). The composition for forming an ink receiving layer may contain components in addition to the components A to C as long as the composition is an actinic ray-curable type composition containing at least the components A to C.

[Composition for Forming Ink Receiving Layer]

—Component A: Radical Polymerizable Compound—

In the present invention, the composition for forming an ink receiving layer contains the component A: radical polymerizable compound. The component A is not particularly limited, and a known radical polymerizable compound can be used. The component A may be a photopolymerizable compound or a thermally polymerizable compound. In the present invention, in order to accomplish both of the scratch resistance and the ink adhesiveness, it is preferable to use a photopolymerizable compound. It is more preferable to select a UV-curable compound (a monomer from which a UV-curable resin is obtained).

The radical polymerizable compound in the present invention is preferably an addition polymerizable compound having at least one ethylenically unsaturated bond. The radical polymerizable compound is more preferably selected from compounds having at least one ethylenically unsaturated bond and preferably having two or more ethylenically unsaturated bonds on a terminal thereof. These compounds are widely known in the field of the related art, and can be used in the present invention without particular limitation.

These compounds have a chemical form such as a monomer or a prepolymer, that is, a dimer, a trimer, an oligomer, a mixture of these, and a copolymer of these. As the polymerizable compound, those described in paragraphs "0116" to "0126" of JP2011-127096A can be used, and the content of the aforementioned document is incorporated into the present invention.

Examples of the monomer and the copolymer thereof include unsaturated carboxylic acid (for example, acrylic acid, methacrylic acid, itaconic acid, crotonic acid, isocrotonic acid, or maleic acid), esters thereof, and amides thereof. Among these, esters of unsaturated carboxylic acid and an aliphatic polyhydric alcohol compound and amides of unsaturated carboxylic acid and an aliphatic polyamine compound are preferably used. Furthermore, a product of an addition reaction between unsaturated carboxylic acid esters or unsaturated carboxylic acid amides having a nucleophilic substituent such as a hydroxyl group, an amino group, or a mercapto group and monofunctional or polyfunctional isocyanates or epoxies; a product of a dehydrocondensation reaction between the aforementioned unsaturated carboxylic acid esters or unsaturated carboxylic acid amides and monofunctional or polyfunctional carboxylic acid; and the like are preferably used. In addition, a product of an addition reaction between unsaturated carboxylic acid esters or unsaturated carboxylic acid amides having an electrophilic substituent such as an isocyanate group or an epoxy group and monofunctional or polyfunctional alcohols, amines, or thiols; and a product of a substitution reaction between unsaturated carboxylic acid esters or unsaturated carboxylic acid amides having a leaving substituent such as a halogen group or a tosyloxy group and monofunctional or polyfunctional alcohols, amines, or thiols are also preferable. Moreover, for example, it is possible to use a group of compounds obtained by substituting the aforementioned unsaturated carboxylic acid with unsaturated phosphonic acid, styrene, vinylether, or the like.

Specific examples of the monomer of the ester of the aliphatic polyhydric alcohol compound and the unsaturated carboxylic acid include an acrylic acid ester such as ethylene glycol diacrylate, triethylene glycol diacrylate, 1,3-butanediol diacrylate, tetramethylene glycol diacrylate, propylene glycol diacrylate, neopentyl glycol diacrylate, trimethylol propane triacrylate, trimethylolpropane ethylene oxide-modified (hereinafter, described as "EO-modified") triacrylate, trimethylolpropane tri s(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tris (acryloyloxyethyl) isocyanurate, polyester acrylate oligomer, isocyanuric acid EO-modified triacrylate, or the like.

As esters other than these, for example, aliphatic alcohol-based esters described in JP1976-47334B (JP-S51-47334B) and JP1982-196231A (JP-S57-196231A), esters having an aromatic skeleton described in JP1984-5240A (JP-S59-5240A), JP1984-5241A (JP-S59-5241A), and JP-1990-226149A (JP-H02-226149A), esters containing an amino group described in JP1989-165613A (JP-H01-165613A), and the like are also suitably used. The aforementioned ester monomers can be used as a mixture.

Specific examples of the monomer of amide of an aliphatic polyamine compound and unsaturated carboxylic acid include methylenebis-acrylamide, methylenebis-methacrylamide, 1,6-hexamethylenebis-acrylamide, 1,6-hexamethylenebis-methacrylamide, diethylenetriamine trisacrylamide, xylylenebisacrylamide, xylylenebismethacrylamide, and the like.

Examples of other preferred amide-based monomers include the monomers having a cyclohexylene structure described in JP1979-21726B (JP-S54-21726B).

Furthermore, a urethane-based addition polymerizable compound manufactured using an addition reaction between isocyanate and a hydroxyl group is also suitable, and specific examples thereof include a vinyl urethane compound containing two or more polymerizable vinyl groups in a single molecule that is obtained by adding a vinyl monomer, which is represented by the following Formula V and has a hydroxyl group, to a polyisocyanate compound described in JP1973-41708B (JP-S48-41708B) having two or more isocyanate groups in a single molecule.

In the following Formula V, $R^7$ and $R^8$ each independently represent a hydrogen atom or a methyl group.

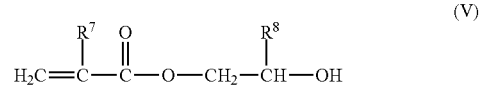

(V)

In addition, the urethane acrylates described in JP1976-37193A (JP-S51-37193A), JP1990-32293B (JP-H02-32293B), and JP1990-16765B (JP-H02-16765B) or the urethane compounds having an ethylene oxide-based skeleton described in JP1983-49860B (JP-S58-49860B), JP1981-17654B (JP-S56-17654B), JP1987-39417B (JP-S62-39417B), and JP1987-39418B (JP-S62-39418B) are also suitable. Furthermore, if the polymerizable compounds having an amino structure or a sulfide structure in a molecule that are described in JP1988-277653A (JP-S63-277653A), JP1988-260909A (JP-S63-260909A), and JP1989-105238A (JP-H01-105238A) are used, a (photosensitive) composition extremely excellent in photo-sensing speed can be obtained.

The examples also include the polyfunctional acrylate or methacrylate such as polyester acrylates or epoxy acrylates obtained by reacting an epoxy resin with (meth)acrylic acid as described in JP1973-64183A (JP-S48-64183A), JP1974-43191B (JP-S49-43191B), and JP1977-30490B (JP-S52-30490B); specific unsaturated compounds described in JP1971-43946B (JP-S46-43946B), JP1989-40337B (HP-H01-40337B), and JP1989-40336B (JP-H01-40336B); the vinyl phosphonate-based compound described in JP1990-25493A (JP-H02-25493A); and the like. In some cases, the structure containing a perfluoroalkyl group described in JP1986-22048A (JP-H61-22048A) is suitably used. Furthermore, the photocurable monomer and oligomer described in The Journal of The Adhesion Society of Japan, Vol. 20, No. 7, pp 300-308 (1984) can also be used.

The details of how to use these radical polymerizable compounds, such as the structure thereof, whether they are used singly or used in combination, and the amount thereof added, can be arbitrarily set according to the design of the final performance of the composition containing the polymerization initiator and the radical polymerizable compound. For example, from the viewpoint described below, the radical polymerizable compound is selected.

In view of curing sensitivity, it is preferable that the radical polymerizable compound has a structure containing many unsaturated groups per single molecule. In many cases, it is preferable that the radical polymerizable compound has two or more functional groups. In order to enhance the strength of the cured film, it is preferable that the radical polymerizable compound has three or more functional groups.

In view of the compatibility between the radical polymerizable compound and other components (for example, a polymerization initiator and the component C) contained in the composition containing the polymerization initiator and the radical polymerizable compound and in view of the dispersibility, either or both of the selection of the radical polymerizable compound and how to use the radical polymerizable compound are important factors. For example, in some cases, the compatibility is improved by the use of a low-purity compound or the use of two or more kinds of other components in combination. Furthermore, for the purpose of improving the adhesiveness with respect to the hard surface of a substrate or the like, a specific structure can be selected.

In the present invention, the polymerizable compound is preferably a monomer of an ester of an aliphatic polyhydric alcohol compound and unsaturated carboxylic acid, more preferably an acrylic acid ester or a methacrylic acid ester, and particularly preferably an acrylic acid ester. From the viewpoint of controlling the physical properties such as a modulus of elasticity of the film, it is preferable to use two or more kinds of radical polymerizable compound in combination. Particularly, from the viewpoint of the ink adhesiveness and the scratch resistance, a combination of (meth) acrylate having two or more functional groups and EO-added (meth)acrylate having two or more functional groups is preferable.

The radical polymerizable compound may be completely cured at the time of forming the ink receiving layer such that a polymerizable group does not remain in the ink receiving layer. Alternatively, the ink receiving layer may be formed by reducing a curing rate (polymerization rate) such that a polymerizable group remains. From the viewpoint of obtaining excellent ink adhesiveness, it is preferable to cause the polymerizable group (ethylenically unsaturated bond) to remain by reducing the curing rate. That is, the ink receiving layer is preferably a layer formed by partially curing the composition for forming an ink receiving layer containing the components A to C. Herein, "partially curing" means a state where the composition is not completely cured. For example, if an ethylenically unsaturated bond is found to remain in the ink receiving layer by Fourier-transform infrared spectroscopy (FT-IR) or the like, such a state is confirmed.

The method for partially curing the composition for forming an ink receiving layer is not particularly limited, and for example, it is possible to select a method for reducing a UV exposure amount. This method will be explained in a method for manufacturing an ink jet recording medium of the present invention that will be described later.

A content of the component A in total solid contents of the composition for forming an ink receiving layer is preferably within a range of 50% to 99% by mass, more preferably within a range of 80% to 98% by mass, and even more preferably within a range of 90% to 97% by mass. If the content is within the above range, the ink adhesiveness becomes excellent.

—Component B: Polymerization Initiator—

In the present invention, the composition for forming an ink receiving layer contains the component B: polymerization initiator.

The polymerization initiator is not particularly limited as long as it has an ability to initiate the polymerization of the component A and can be appropriately selected from known polymerization initiators. For example, a polymerization initiator which exhibits photosensitivity with respect to light rays in a region of ultraviolet rays to visible rays is preferable. Furthermore, the polymerization initiator may be an activator which generates an active radical by using a certain interaction with a photoexcited sensitizer. The polymerization initiator is roughly classified into a thermal polymerization initiator and a photopolymerization initiator. It is preferable to form the ink receiving layer by photocuring, and accordingly, a photopolymerization initiator is preferable. Furthermore, the component B is preferably a radical polymerization initiator. Therefore, the component B is particularly preferably a photo-radical polymerization initiator.

As the polymerization initiator in the present invention, those known as the following polymerization initiators can be used. As the polymerization initiator, it is possible to use those described in paragraphs "0128" to "0177" of JP2011-127096A.

Examples of the polymerization initiator include a halogenated hydrocarbon derivative (for example, a halogenated hydrocarbon derivative having a triazine skeleton or an oxadiazole skeleton), an acyl phosphine compound such as acyl phosphine oxide, hexaarylbiimidazole, an oxime compound such as an oxime derivative, organic peroxide, a thio compound, a ketone compound, an aromatic onium salt, ketoxime ether, an aminoalkylphenone compound, an aminoacetophenone compound, a hydroxyacetophenone compound, and the like. Among these, a hydroxyacetophenone compound is preferably used.

Examples of the halogenated hydrocarbon compound having a triazine skeleton include the compound described in Wakabayashi et al., Bull. Chem. Soc. Japan, 42, 2924 (1969), the compound described in UK1388492B, the compound described in JP1978-133428A (JP-H53-133428A), the compound described in DE3337024B, the compound described in F. C. Schaefer et al., J. Org. Chem, 29.; 1527 (1964), the compound described in JP1987-58241A (JP-S62-58241A), the compound described in JP1993-281728A (JP-H05-281728A), the compound described in JP1993-34920A (JP-H05-34920A), the compound described in U.S. Pat. No. 4,212,976A, and the like.

Examples of polymerization initiators other than the above compounds include an acridine derivative (for example, 9-phenylacridine or 1,7-bis(9,9'-acridinyl) heptane), N-phenylglycine or the like, a polyhalogen compound (for example, carbon tetrabromide, phenyl tribromomethyl sulfone, or phenyl trichloromethyl ketone), coumarins (for example, 3-(2-benzofuranoyl)-7-diethylamino coumarin, 3-(2-benzofuroyl)-7-(1-pyrrolidinyl) coumarin, 3-benzoyl-7-diethylamino coumarin, 3-(2-methoxybenzoyl)-7-diethylaminocoumarin, 3-(4-dimethylaminobenzoyl)-7-diethylaminocoumarin, 3,3'-carbonyl bis(5,7-di-n-propoxycoumarin), 3,3'-carbonylbis(7-diethylaminocoumarin), 3-benzoyl-7-methoxycoumarin, 3-(2-furoyl)-7-diethylaminocoumarin, 3-(4-diethylaminocinnamoyl)-7-diethylminocoumarin, 7-methoxy-3-(3-pyridylcarbonyl) coumarin, 3-benzoyl-5,7-dipropoxy coumarin, 7-benzotriazol-2-ylcoumarin, and the coumarin compounds described in JP1993-19475A (JP-H05-19475A), JP1995-271028A (JP-H07-271028A), JP2002-363206A, JP2002-363207A, JP2002-363208A, JP2002-363209A, and the like), acyl phosphine oxides (for example, bis(2,4,6-trimethylbenzoyl)-phenyl phosphine oxide, bis(2,6-dimethoxybenzoyl)-2,4,4-trimethyl-pentyl-phenyl phosphine oxide, or Lucirin TPO), metharocenes (for example, bis($\eta^5$-2,4-cyclopentadien-1-yl)-bis(2,6-difluoro-3-(1H-pyrrol-1-yl)-phenyl) titanium, or $\eta^5$-cyclopentadienyl-η⁶-cumenyl-iron(1+)-hexafluorophosphate(1−)), the compounds described in JP1978-133428A (JP-S53-133428A), JP1982-1819B (JP-S57-1819B), JP1982-6096B (JP-S57-6096B), U.S. Pat. No. 3,615,455A, and the like.

As the polymerization initiator, a hydroxyacetophenone compound, an aminoalkylphenone compound, an aminoacetophenone compound, and an acyl phosphine compound can also be suitably used. More specifically, for example, it is also possible to use the aminoacetophenone-based initiator described in JP1998-291969A (JP-H10-291969A) and the acyl phosphine oxide-based initiator described in JP4225898B.

As the hydroxyacetophenone-based initiator, it is possible to use IRGACURE 184, DAROCUR 1173, IRGACURE 500, IRGACURE 2959, and IRGACURE 127 (trade names: all manufactured by BASF SE). As the aminoalkylphenone-based initiator, it is possible to use IRGACURE 907, IRGACURE 369, and IRGACURE 379EG (trade names: all manufactured by BASF SE). As the aminoacetophenone-based initiator, it is possible to use IRGACURE 907, IRGACURE 369, and IRGACURE 379 (trade names: all manufactured by BASF SE) which are commercially available products. As the aminoacetophenone-based initiator, it is also possible to use the compound described in JP2009-191179A whose absorption wavelength is matched with a light source having a wavelength of 365 nm, 405 nm, or the like. Furthermore, as the acyl phosphine-based initiator, it is possible to use IRGACURE 819 or DAROCUR TPO (trade names: all manufactured by BASF SE) which is a commercially available product.

As the polymerization initiator, an oxime-based compound can also be suitably used. Specific examples of the oxime-based initiator include the compounds described in JP2001-233842A, JP2000-80068A, and JP2006-342166A.

Examples of oxime ester compound include the compounds described in J. C. S. Perkin II (1979), pp. 1653-1660), J. C. S. Perkin II (1979), pp. 156-162, Journal of Photopolymer Science and Technology (1995), pp. 202-232, and JP2000-66385A, the compounds described in JP2000-80068A, JP2004-534797A, and JP2006-342166A, and the like.

As commercially available products, IRGACURE OXE01 and IRGACURE OXE02 (all manufactured by BASF SE) are also suitably used.

As oxime ester compounds other then the above, the compound described in JP2009-519904A in which oxime is linked to the N-position of carbazole, the compound described in U.S. Pat. No. 7,626,957B in which a hetero substituent is introduced into a benzophenone moiety, the compound described in JP2010-15025A and US2009/292039A in which a nitro group is introduced into a colorant moiety, the ketoxime-based compound described in WO2009/131189A, the compound described in U.S. Pat. No. 7,556,910B containing a triazine skeleton and an oxime skeleton in the same molecule, the compound described in JP2009-221114A having maximum absorption at 405 nm and exhibiting excellent sensitivity with respect to a light source of g-line, and the like may also be used.

In the present invention, one kind of polymerization initiator may be used singly, or if necessary, two or more kinds thereof may be used in combination.

A content of the polymerization initiator contained in the composition for forming an ink receiving layer (in a case where two or more kinds thereof are used, a total content) is, with respect to total solid contents of the composition, preferably equal to or greater than 0.1% by mass and equal to or less than 20% by mass, more preferably equal to or greater than 0.5% by mass and equal to or less than 15% by mass, and even more preferably equal to or greater than 1.0% by mass and equal to or less than 10% by mass. If the content is within the above range, excellent sensitivity and adhesiveness are obtained.

—Component C: Compound Represented by Formula C-1—

In the present invention, the composition for forming an ink receiving layer contains the component C: compound represented by Formula C-1. The component C is a compound functioning as a surfactant. It is a fluorine-based surfactant in which a terminal of a fluoroalkyl group is hydrogenated.

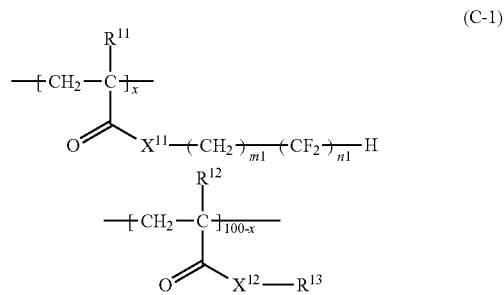

(C-1)

In Formula C-1, $R^{11}$ and $R^{12}$ each independently represent a hydrogen atom or a methyl group, $X^{11}$ and $X^{12}$ each independently represent an oxygen atom, a sulfur atom, or $NR^{14}$, m1 represents an integer of equal to or greater than 1 and equal to or less than 6, n1 represents an integer of equal to or greater than 2 and equal to or less than 20, $R^{13}$ represents a hydrogen atom or an alkyl group having 1 to 30 carbon atoms, $R^{14}$ represents a hydrogen atom or an alkyl group having 1 to 8 carbon atoms, and X represents a molar ratio (%) and is equal to or greater than 20.

In Formula C-1, $R^{11}$ and $R^{12}$ each independently represent a hydrogen atom or a methyl group.

In Formula C-1, $X^{11}$ and $X^{12}$ each independently represent an oxygen atom, a sulfur atom, or $NR^{14}$. $R^{14}$ represents a hydrogen atom or an alkyl group having 1 to 8 carbon atoms. The alkyl group represented by $R^{14}$ may be linear, branched, or cyclic. The alkyl group represented by $R^{14}$ preferably has 1 to 6 carbon atoms, and more preferably has 1 to 4 carbon atoms. $R^{14}$ is particularly preferably a hydrogen atom or an alkyl group having 1 to 4 carbon atoms. Each of $X^{11}$ and $X^{12}$ is preferably an oxygen atom or $NR^{14}$, and more preferably an oxygen atom.

$R^{13}$ represents a hydrogen atom or an alkyl group having 1 to 30 carbon atoms, and is preferably a hydrogen atom or an alkyl group having 1 to 20 carbon atoms. A portion of a carbon chain of the alkyl group represented by $R^{13}$ may be substituted with one or plural bonds or one or plural groups selected from the group consisting of an ether bond (—O—), an ester bond (—C(=O)—O—), a carbonyl group (—C(=O)—), an amide bond (—C(=O)—NR—), a urethane bond (—NR—C(=O)—O—), and a urea bond (—NR—C(=O)—NR—). R represents a hydrogen atom or an alkyl group having 1 to 4 carbon atoms. Specific examples thereof include an alkyloxyalkyl group, a poly(alkyleneoxy)alkyl group, and the like. $R^{13}$ may further have a substituent, and examples of the substituent include a hydroxy group.

Examples of $R^{13}$ preferably include a hydrogen atom, a methyl group, an ethyl group, a n-propyl group, an i-propyl group, a n-butyl group, an i-butyl group, a sec-butyl group, a t-butyl group, a (poly)alkyloxy group, and the like, and more preferably include a hydrogen atom, a methyl group, an ethyl group, a n-propyl group, an i-propyl group, a n-butyl group, an i-butyl group, a sec-butyl group, and a t-butyl group.

m1 represents an integer of equal to or greater than 1 and equal to or less than 6. m1 is preferably an integer of 1 to 4, and more preferably an integer of 1 to 3.

n1 represents an integer of equal to or greater than 2 and equal to or less than 20. n1 is preferably 2 to 16, more preferably 3 to 12, and even more preferably 4 to 8.

X represents a molar ratio (mol %) of each monomer unit, and is equal to or greater than 20. X is preferably 40 to 100, more preferably 60 to 100, even more preferably 80 to 99 and particularly preferably 90 to 99.

In the present invention, the component C may contain only one kind of monomer unit at X mol % or contain two or more kinds thereof at X mol %. For example, the component C may be a polymer composed of plural monomer units that differ from each other in terms of m1 and/or n1. Likewise, the component C may contain only one kind of monomer unit at (100−X) mol % or contain two or more kinds thereof at (100−X) mol %. For example, the component C may contain monomer units derived from acrylic acid and an acrylic acid ester.

In the present invention, a weight-average molecular weight of the component C is preferably $1.0 \times 10^3$ to $1.00 \times 10^6$, more preferably $2.5 \times 10^3$ to $3.00 \times 10^5$, and even more preferably $5.0 \times 10^3$ to $1.00 \times 10^5$. It is preferable that the weight-average molecular weight of the component C is within the above range, because then the density unevenness at the time of printing is suppressed.

A glass transition temperature of the component C is preferably −50° C. to −10° C., more preferably −45° C. to −20° C., and even more preferably −38° C. to −31° C. It is preferable that the glass transition temperature is within the above range, because then the density unevenness at the time of printing is suppressed, although a detail about the reason is unclear.

In the present invention, the glass transition temperature is measured by the following method. Specifically, by using a differential scanning calorimeter (for example, X-DSC 7000 manufactured by Hitachi High-Tech Science Corporation), 5.0 mg of a sample is put into a simply sealed container and heated in a nitrogen atmosphere at a heating rate of 10° C./min, and a temperature at a point where a baseline of the obtained curve of differential scanning calorimetry (DSC) intersects with a tangent line at a point of inflection is read as the glass transition temperature.

One kind of component C may be used singly, or two or more kinds thereof may be used in combination.

A content of the component C in the ink receiving layer is preferably 0.0001 to 0.0090 g/m², more preferably 0.0004 to 0.0081 g/m², even more preferably 0.0008 to 0.0081 g/m², and particularly preferably 0.0008 to 0.0040 g/m². Examples of the content include 0.0008 g/m², 0.0016 g/m², 0.0024 g/m², 0.0032 g/m², 0.0040 g/m², 0.0081 g/m², and the like, but the content is not limited to these. If the content of the component C is within the above range, the adhesiveness between the support and the ink becomes excellent, and the density unevenness at the time of printing is suppressed.

—Other Components—

In the present invention, the composition for forming an ink receiving layer may contain other components in addition to the components A to C. Examples of other components include a surfactant other than the component C and a resin.

Examples of the surfactant other than the component C include known anionic, nonionic, and cationic surfactants, a known fluorine-based surfactant, and a known silicone-based surfactant. The surfactant is described in, for example, "Surfactant Handbook" (Ichiro Nishi, Ichiro Imai, and Shozo Kasai, Sangyo Tosho Publishing Co., Ltd., 1960).

Examples of the fluorine-based surfactant include a fluoroaliphatic group-containing copolymer (simply described as a "fluorine-based polymer" in some cases). It is preferable that the fluorine-based polymer has a constitutional unit derived from fluorine-containing vinyl monomer and a constitutional unit for imparting cross-linking properties. Preferred examples of the constitutional unit of the fluorine-based polymer include the compounds described in paragraphs "0095" to "0102" of JP2011-75942A.

Examples of the fluorine-based polymer include a random copolymer of perfluoroolefin and vinyl ethers or vinyl esters. Particularly, it is preferable that the fluorine-based polymer has a group which can cause a cross-linking reaction alone (a radically polymerizable group such as a (meth)acryloyl group or a ring-opening polymerizable group such as an epoxy group or an oxetanyl group). These polymerization units containing a group having cross-linking reactivity preferably account for 5 to 70 mol % and particularly preferably account for 30 to 60 mol % of the total polymerization units of the polymer. Preferred examples of the polymer include those described in JP2002-243907A, JP2002-372601A, JP2003-26732A, JP2003-222702A, JP2003-294911A, JP2003-329804A, JP2004-4444A, and JP2004-45462A.

For the purpose of imparting antifouling properties, a polysiloxane structure may be introduced into the fluorine-based polymer. The method for introducing the polysiloxane structure is not particularly limited, and for example, it is preferable to use a method of introducing a polysiloxane block copolymerization component by using a silicone macro-azo initiator as described in JP1994-93100A (JP-H06-93100A), JP1999-189621A (JP-H11-189621A), JP1999-228631A (JP-H11-228631A), and JP2000-313709A; or a method of introducing a polysiloxane graft copolymerization component by using a silicone macromer as described in JP1990-251555A (JP-H02-251555A) and JP1990-308806A (JP-H02-308806A). Examples of particularly preferred compounds include the polymers of Examples 1, 2, and 3 of JP1999-189621A (JP-H11-189621A) or the copolymers A-2 and A-3 of JP1990-251555A (JP-H02-251555A). The amount of these polysiloxane components contained in the polymer is preferably 0.5% to 10% by mass and particularly preferably 1% to 5% by mass.

In the present invention, a content of the fluorine-based surfactant other than the component C is preferably equal to or less than the content of the component C, more preferably equal to or less than 50% by mass of the content of the component C, and even more preferably equal to or less than 10% by mass. It is particularly preferable that the composition for forming an ink receiving layer does not contain the fluorine-based surfactant.

Examples of commercially available anionic surfactants include RAPISOL A-90, RAPISOL A-80, RAPISOL BW-30, RAPISOL B-90, and RAPISOL C-70 (trade names, manufactured by NOF CORPORATION), NIKKOL OTP-100 (trade name, manufactured by Nikko Chemicals Co., Ltd.), KOHACOOL ON, KOHACOOL L-40, and PHOS- PHANOL 702 (TOHO Chemical Industry Co., Ltd.), BEAULIGHT A-5000 and BEAULIGHT SSS (Sanyo Chemical Industries, Ltd.), and the like.

Examples of commercially available nonionic surfactants include NAROACTY CL-95 and HN-100 (trade names, manufactured by Sanyo Chemical Industries, Ltd.), RISOREX BW400 (KOKYU ALCOHOL KPGYO CO., LTD.), EMALEX ET-2020 (NIHON EMULSION Co., Ltd.), UNILUB 50MB-26 and NONION IS-4 (NOF CORPORATION), and the like.

Examples of commercially available fluorine-based surfactants include MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, MEGAFACE F780, MEGAFACE F781, and MEGAFACE F784 (all manufactured by DIC Corporation), FLUORAD FC430, FLUORAD FC431, and FLUORAD FC171 (all manufactured by Sumitomo 3M, Ltd.), SURFLON S-382, SURFLON SC-101, SURFLON SC-103, SURFLON SC-104, SURFLON SC-105, SURFLON SC-1068, SURFLON SC-381, SURFLON SC-383, SURFLON 5393, and SURFLON KH-40 (all manufactured by ASAHI GLASS CO., LTD.), PF636, PF656, PF6320, PF6520, and PF7002 (manufactured by OMNOVA Solutions Inc.), and the like.

Specific examples of commercially available cationic surfactants include a phthalocyanine derivative (trade name: EFKA-745, manufactured by MORISHITA & CO., LTD.), an organosiloxane polymer KP341 (manufactured by Shin-Etsu Chemical Co., Ltd.), (meth)acrylic acid-based (co) polymers POLYFLOW NO. 75, NO. 90, and NO. 95 (manufactured by KYOEISHA CHEMICAL Co., LTD.), W001 (manufactured by Yusho Co Ltd), and the like.

Examples of commercially available silicone-based surfactants include TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (manufactured by Dow Corning Toray Co., Ltd.), TSF-4440, TSF-4300, TSF-4445, TSF-4460, and TSF-4452 (manufactured by Momentive Performance Materials Inc.), KP 341, KF 6001, and KF 6002 (manufactured by Shin-Etsu Silicones), BYK 307, BYK 323, and BYK 330 (manufactured by BYK-Chemie GmbH), and the like.

One kind of surfactant other than component C may be used singly, or two or more kinds thereof may be used in combination.

The function of the resin contained in the ink receiving layer is not particularly limited. Examples of the resin include a polyester-based resin, a polyurethane-based resin, or an acrylic resin which functions as a binder, a cellulose acylate resin which functions as a viscosity adjuster, and the like.

The resin contained in the ink receiving layer is preferably a cellulose acylate resin, and the ink receiving layer may contain two or more kinds of cellulose acylate resin. Examples of commercially available products thereof include cellulose acetate butyrate (CAB, manufactured by Eastman Chemical Japan Ltd.) and the like.

The amount of the resin contained in the ink receiving layer is, with respect to total solid contents of the composition for forming an ink receiving layer, preferably 0.1% to 20% by mass, more preferably 1% to 10% by mass, and particularly preferably 1% to 5% by mass,. In a case where the ink receiving layer contains two or more kinds of resin, the total amount of the resin should be within the above range.

A thickness of the ink receiving layer is, for example, preferably 0.1 to 50 μm, more preferably 1 to 40 μm, and particularly preferably 3 to 30 μm.

<Interlayer>

It is preferable that the ink jet recording medium of the present invention has a single interlayer or (plural) interlayers constituted with two or more layers, at least between the ink receiving layer and the support or between the pressure sensitive adhesive layer, which will be described later, and the support. Particularly, from the viewpoint of improving the adhesiveness between the ink receiving layer and the support and improving the ink adhesiveness, it is preferable that the ink receiving layer has the interlayer at least between the ink receiving layer and the support.

(Resin)

The composition of the interlayer is not particularly limited, but it is preferable that the interlayer contains at least a resin. The resin contained in the interlayer is not particularly limited, and known resins can be used. Particularly, it is preferable that the interlayer of the ink jet recording medium of the present invention contains at least one kind of resin among a polyester-based resin, a polyurethane-based resin, an acrylic resin, and a polyolefin-based resin.

The interlayer may be constituted with a single layer or two or more layers. Hereinafter, the interlayer between the ink receiving layer and the support will be described, but a preferred scope of the interlayer between the pressure sensitive adhesive layer and the support is also the same. Specifically, a preferred scope of an interlayer A, which will be described later, preferable as the interlayer between the ink receiving layer and the support is the same as a preferred scope of an interlayer D, which will be described later, preferable as the interlayer between the pressure sensitive adhesive layer and the support. Furthermore, a preferred scope of an interlayer B, which will be described later, preferable as the interlayer between the ink receiving layer and the support is the same as a preferred scope of an interlayer E, which will be described later, preferable as the interlayer between the pressure sensitive adhesive layer and the support. In addition, a preferred scope of an interlayer C, which will be described later, preferable as the interlayer between the ink receiving layer and the support is the same as a preferred scope of an interlayer F, which will be described later, preferable as the interlayer between the pressure sensitive adhesive layer and the support.

In a case where the ink jet recording medium has the interlayer, the layer constitution thereof is preferably, for example, ink receiving layer/interlayer A/support/interlayer D/pressure sensitive adhesive layer, ink receiving layer/interlayer B/interlayer A/support/interlayer D/interlayer E/pressure sensitive adhesive layer, or ink receiving layer/interlayer C/interlayer B/support/interlayer E/interlayer F/pressure sensitive adhesive layer.

From the viewpoint of improving both of the ink adhesiveness and the scratch resistance, it is preferable that the interlayer of the ink jet recording medium of the present invention includes the interlayer A having a thickness of less than 0.1 μm. Particularly, in a case where the interlayer between the ink receiving layer and the support is constituted with a single layer, from the viewpoint of improving both of the ink adhesiveness and the scratch resistance, it is preferable that the interlayer includes such an interlayer A.

A lower limit of the thickness of the interlayer is not particularly limited, and is preferably equal to or greater than 0.01 μm.

In a case where the interlayer is constituted with two or more layers, from the viewpoint of improving both of the ink adhesiveness and the scratch resistance, it is also preferable that the interlayer includes the interlayer A. Furthermore, in a case where the ink receiving layer combines the interlayer A with other interlayers, from the viewpoint of improving the ink adhesiveness, it is preferable that the ink jet recording medium of the present invention has the interlayer A and the interlayer B in this order from the support.

The composition of the interlayer A is not particularly limited. The interlayer A preferably contains a polyester-based resin which will be described later, a polyurethane resin (preferably an isocyanate group-containing self-cross-linking polyurethane resin which is an isocyanate-based compound), a catalyst of a cross-linking agent, a surfactant (preferably an anionic surfactant), particles, and a lubricant, and more preferably contains a polyurethane resin, a catalyst of a cross-linking agent, a surfactant, particles, and a lubricant.

From the viewpoint of improving the ink adhesiveness, at least one of the interlayers in the ink jet recording medium of the present invention is preferably the interlayer B which has a thickness of equal to or greater than 0.1 μm and contains a polyolefin-based resin in a proportion of equal to or greater than 10%. An upper limit of the thickness of the interlayer B is not particularly limited, but is preferably equal to or less than 10 μm.

A modulus of elasticity of the interlayer B is preferably equal to or less than 500 MPa. The modulus of elasticity of the interlayer B is more preferably equal to or greater than 10 MPa and equal to or less than 500 MPa, and even more preferably equal to or greater than 50 MPa and equal to or less than 500 MPa. While the interlayer of the related art has a modulus of elasticity of equal to or greater than 600 MPa, the interlayer B preferably has an extremely small modulus of elasticity as described above. Accordingly, when the support or the ink receiving layer undergoes elastic deformation, the interlayer B expands or contracts at an extreme micro-level so as to follow the change in the shape of the support or the ink receiving layer. For example, when the ink receiving layer is deformed in a direction approaching the support as if the ink receiving layer is pressed on the support, the interlayer B contracts and the thickness thereof is reduced. Furthermore, when the deformed ink receiving layer restores its original shape, the interlayer B also restores its original thickness and shape. In this way, the interlayer B has a property of changing the thickness and restoring the shape. By imparting elasticity to the interlayer B, even if the shape of the ink receiving layer is changed, the ink receiving layer remains adhering to the support without being peeled off. Herein, the peeling of the ink receiving layer from the support means at least one of the peeling of the ink receiving layer from the interlayer B, the internal destruction of the interlayer B, and the peeling of the interlayer from the support.

It is preferable that the interlayer B contains a polyolefin-based resin at least in an amount of 10% by mass. If the interlayer B contains the polyolefin-based resin in an amount of equal to or greater than 10% by mass, the modulus of elasticity of the interlayer B falls into the aforementioned range. The interlayer B contains the polyolefin-based resin preferably in an amount of equal to or greater than 10% by mass and equal to or less than 90% by mass, and more preferably in an amount of equal to or greater than 20% by mass and equal to or less than 80% by mass.

The composition of the interlayer B is not particularly limited as long as it contains the polyolefin-based resin in an amount of equal to or greater than 10% by mass. From the viewpoint of increasing the elongation at break of the interlayer by combining the interlayer B with the polyolefin resin, it is preferable that the interlayer B contains an acrylic resin. Examples of commercially available acrylic resins include AS-563A (manufactured by DAICEL FINECHEM LTD.) and the like. Furthermore, it is preferable that the interlayer B contains a cross-linking agent, a surfactant, and a preservative.

It is preferable that the interlayer of the ink jet recording medium of the present invention is constituted with two or more layers, and at least one of the interlayers is the interlayer C containing at least one kind of resin between a polyester-based resin and a polyurethane-based resin, because then the polymerization initiator and the polymerizable compound contained in the ink receiving layer are easily diffused, and hence the ink adhesiveness can be improved. If used by being laminated on the interlayer B, the interlayer C can further improve the ink adhesiveness. Therefore, from the viewpoint of improving the ink adhesiveness, it is preferable that the ink jet recording medium of the present invention has the interlayer B and the interlayer C in this order from the support.

The composition of the interlayer C is not particularly limited as long as it contains at least one kind of resin between a polyester-based resin and a polyurethane-based resin. It is preferable that the interlayer C contains a cross-linking agent, a surfactant, a lubricant, and a preservative.

Hereinafter, the resin that can be preferably used in the interlayer will be described.

—Polyester Resin—

The interlayer may contain a polyester resin.

The polyester resin is a generic name of polymers having an ester bond on a main chain thereof, and generally obtained through a reaction between polycarboxylic acid and polyol. Examples of the polycarboxylic acid include fumaric acid, itaconic acid, adipic acid, sebacic acid, terephthalic acid, isophthalic acid, sulfoisophthalic acid, naphthalene dicarboxylic acid, and the like. Examples of the polyol include ethylene glycol, propylene glycol, glycerin, hexanetriol, butanediol, hexanediol, 1,4-cyclohexane dimethanol, and the like. The polyester resin and raw materials thereof are described in, for example, "Polyester Resin Handbook" (Eichiro Takiyama, NIKKAN KOGYO SHIMBUN, LTD., 1988), and the description can be applied to the present invention.

Examples of the polyester resin include a polyhydroxybutyrate (PHB)-based resin, a polycaprolactone (PCL)-based resin, a polycaprolactone butylene succinate-based resin, a polybutylene succinate (PBS)-based resin, a polybutylene succinate adipate (PBSA)-based resin, a polybutylene succinate carbonate-based resin, a polyethylene terephthalate succinate-based resin, a polybutylene adipate terephthalate-based resin, a polytetramethylene adipate terephthalate-based resin, a polybutylene adipate terephthalate-based resin, a polyethylene succinate (PES)-based resin, a polyglycolic acid (PGA)-based resin, a polylactic acid (PLA)-based resin, a polycarbonate copolymer of aliphatic polyester, a copolymer of aliphatic polyester and polyamide, and the like. The polyester resin can also be obtained as commercially available products such as FINETEX ES650 and ES2200 (manufactured by DIC Corporation), VYLONAL MD1245, MD1400, and MD1480 (manufactured by TOYOBO CO., LTD.), PESRESIN A-110, A-124GP, A-520, and A-640 (manufactured by TAKAMATSU OIL & FAT CO., LTD.), and PLAS COAT Z561, Z730, Z687, and Z592 (manufactured by GOO CHEMICAL CO., LTD.).

—Polyurethane-Based Resin—

Polyurethane is a generic name of polymers having a urethane bond on a main chain thereof, and is generally obtained through a reaction between polyisocyanate and polyol. Examples of the polyisocyanate include toluene diisocyanate (TDI), diphenylmethane diisocyanate (MDI), naphthalene diisocyanate (NDI), tolidine diisocyanate (TODI), hexamethylene diisocyanate (HDI), isophorone isocyanate (IPDI), and the like. Examples of the polyol include ethylene glycol, propylene glycol, glycerin, hexanetriol, and the like. As isocyanate used in the present invention, it is possible to use a polymer whose molecular weight is increased by a chain elongation treatment performed on a polyurethane polymer obtained through a reaction between polyisocyanate and polyol. The polyisocyanate, the polyol, and the chain elongation treatment are described in, for example, "Polurethane Handbook" (Keiji Iwata, NIKKAN KOGYO SHIMBUN, LTD., 1987). The polyurethane resin can be obtained as commercially available products such as SUPERFLEX 470, 210, and 150 HS, and ELASTRON H-3 and H-3-DF (manufactured by DAI-ICHI KOGYO SEIYAKU CO., LTD.), HYDRAN AP-20, AP-40F, and WLS-210 (manufactured by DIC Corporation), and TAKELAC W-6061 and OLESTER UD-350 (manufactured by Mitsui Chemicals, Inc.).

—Acrylic Resin—

It is preferable that the interlayer contains an acrylic resin. If used in combination with polyolefin in the same interlayer, the acrylic resin can increase the elongation at break of the interlayer.

The acrylic resin is a polymer composed of a polymerizable monomer having a carbon-carbon double bond that is represented by an acrylic monomer or a methacrylic monomer. The polymer may be a homopolymer or a copolymer. The polymer also includes a copolymer of the above polymers and other polymers (for example, polyester and polyurethane). For example, the copolymer may be a block copolymer or a graft copolymer. Alternatively, the polymer includes a polymer (a polymer mixture in some cases) which is obtained by polymerizing a polymerizable monomer having a carbon-carbon double bond in a polyester solution or in a polyester dispersion. In addition, the polymer also includes a polymer (a polymer mixture in some cases) which is obtained by polymerizing a polymerizable monomer having a carbon-carbon double bond in a polyurethane solution or in a polyurethane dispersion. Furthermore, the polymer also includes a polymer (a polymer mixture in some cases) which is obtained by polymerizing a polymerizable monomer having a carbon-carbon double bond in a solution or dispersion of other polymers. In order to further improve the adhesiveness, the polymer can contain a hydroxyl group or an amino group. The polymerizable monomer having a carbon-carbon double bond is not particularly limited. Examples of particularly typical compounds thereof include various carboxyl group-containing monomers and a salt thereof, such as acrylic acid, methacrylic acid, crotonic acid, itaconic acid, fumaric acid, maleic acid, and citraconic acid; various hydroxyl group-containing monomers such as 2-hydroxyethyl (meth)acrylate, 2-hydroxypropyl (meth)acrylate, 4-hydroxybutyl (meth)acrylate, monobutyl hydroxyfumarate, and monobutyl hydroxyitaconate; various (meth)acrylic acid esters such as methyl (meth)acrylate, ethyl (meth) acrylate, propyl (meth)acrylate, butyl (meth)acrylate, and lauryl (meth)acrylate; various nitrogen-containing compounds such as (meth)acrylamide, diacetoneacrylamide, N-methylolacrylamide and (meth)acrylonitrile; various styrene derivatives such as styrene, $\alpha$-methyl styrene, divinylbenzene, and vinyl toluene; various vinyl esters such as vinyl propionate; various silicon-containing polymerizable monomers such as $\gamma$-methacryloxypropyl trimethoxysilane, and vinyl trimethoxysilane; phosphorus-containing vinyl-based monomers; various vinyl halides such as vinyl chloride and vinylidene chloride; and various conjugated dienes such as butadiene. As the acrylic acid ester copolymer, a commercially available product such as JURYMER ET-410 (manufactured by TOAGOSEI CO., LTD.) or EM-48D (manufactured by DAICEL CORPORATION) is preferably used.

When the acrylic resin is used in combination with polyolefin in a single interlayer, the proportion of mass of the acrylic resin to the polyolefin is preferably within a range of equal to or greater than 0% and equal to or less than 700%, more preferably within a range of equal to or greater than 5% and equal to or less than 700%, and even more preferably within a range of equal to or greater than 30% and equal to or less than 300%.

—Polyolefin-Based Resin—

The polyolefin-based resin is generally known to exhibit weak adhesion with respect to polyester. In the related art, the polyolefin-based resin has not been used as a main component in the interlayer for bringing the ink receiving layer composed of polyester into close contact with the support. Furthermore, the polyolefin-based resin has been used in the interlayer only in a case where polyolefin is used in the support or the ink receiving layer.

In the present invention, it is preferable to use polyolefin in the interlayer B between the support and the ink receiving layer. In order to prevent the ink receiving layer from being peeled from the support even when the polyolefin is used as a main component of the interlayer B, it is preferable that a thickness T of the interlayer B is at least 0.1 µm, that is, equal to or greater than 0.1 µm. If the thickness of the interlayer is equal to or greater than 0.1 µm, the ink receiving layer is not easily peeled from the support, particularly in a high-density print portion to which a large amount of ink is jetted. Furthermore, if the thickness of the interlayer is set as described above, for example, the stress, which is applied as a load to the ink receiving layer or the support due to a cross cutter at the time of a cross cut test, is relaxed in the interlayer B. The thickness T of the interlayer B is preferably within a range of greater than 0.1 µm and equal to or less than 5.0 µm, more preferably within a range of greater than 0.3 µm and equal to or less than 5.0 µm, and even more preferably within a range of greater than 0.2 µm and equal to or less than 4 µm. It is preferable that the thickness T of the interlayer B is constant.

If the ink jet recording medium of the present invention has the interlayer B, the stress is dispersed. Therefore, even if the ink receiving layer is not sufficiently dyed with the ink composition, the ink adhesiveness can be improved.

If the resin which does not easily deteriorate at a high temperature and a high humidity is used, even when the interlayer is evaluated as in the related art by being left in a moist and hot environment (for example, by being left for 100 hours to 500 hours while being dried at 85° C. or 65° C. at a relative humidity of 95%), the modulus of elasticity and the elongation at break thereof are maintained as described above. The polyolefin-based resin is a resin that does not easily deteriorate at a high temperature and a high humidity.

Therefore, if the polyolefin-based resin is used, even when the interlayer is left in a moist and hot environment, the modulus of elasticity and the elongation at break of the interlayer can be maintained as described above.

The polyolefin is a polymer obtained by polymerizing alkene such as ethylene, butylene, or propylene, and may be a copolymer having the corresponding structure. Hereinafter, the polymer and the copolymer will be collectively called a polyolefin-based polymer. Specifically, the polyolefin-based polymer is preferably any one of the following copolymers.

Copolymer composed of ethylene or propylene and an acryl monomer or a methacryl monomer Copolymer composed of ethylene or propylene and carboxylic acid (including anhydride)

Copolymer composed of ethylene or propylene, an acryl monomer or a methacryl monomer, and carboxylic acid (including anhydride)

Specific examples of the acryl monomer or the methacryl monomer constituting the polyolefin-based polymer preferably include methyl methacrylate, ethyl acrylate, butyl acrylate, 2-hydroxyethyl acrylate, and the like.

Examples of the carboxylic acid monomer constituting the polyolefin-based polymer preferably include acrylic acid, methacrylic acid, itaconic acid, maleic acid, maleic anhydride, and the like. One kind of these may be used singly, or plural kinds thereof may be used by being mixed together.

A total amount of ethylene unit or propylene unit in the polyolefin-based polymer is preferably within a range of 80 to 98 mol %, and more preferably within a range of 85 to 95 mol %. Furthermore, a total amount of the acryl monomer unit or the methacryl monomer unit is preferably within a range of 0 to 20 mol %, and more preferably within a range of 3 to 10 mol %. In addition, a total amount of the carboxylic acid monomer unit is preferably within a range of 0 to 15 mol %, and more preferably within a range of 1 to 10 mol %. If the monomers are composed within the above range, excellent adhesiveness and durability can be achieved at the same time.

A molecular weight of the polyolefin-based polymer is preferably about $2.0 \times 10^3$ to $2.00 \times 10^5$. The polyolefin-based polymer may have a linear structure or a branched structure. It is preferable that the polyolefin-based polymer is in the form of an aqueous polymer dispersion (so-called latex). Examples of a method for manufacturing the aqueous polymer dispersion of the polyolefin-based polymer include an emulsification method and an emulsification/dispersion method, and the emulsification method is preferable. As the specific method thereof, for example, the method described in JP3699935B can be referred to.

In a case where the polyolefin-based polymer is in the form of latex of an aqueous polymer, it is preferable that the polyolefin-based polymer has a functional group having affinity with water, such as a carboxyl group or a hydroxyl group. Furthermore, in a case where the polyolefin-based polymer is used in the form of latex, in order to improve the stability, a surfactant (example: anionic or nonionic surfactant) or an emulsion stabilizer such as a polymer (example: polyvinyl alcohol) may be added thereto. In addition, if necessary, compounds known as additives for latex, such as a pH adjuster (example: ammonia, triethylamine, or sodium hydrogen carbonate), a preservative (example: 1,3,5-hexahydro-(2-hydroxyethyl)-s-triazine or 2-(4-thiazolyl)benzimidazole), a thickener (example: sodium polyacrylate or methyl cellulose), and a film formation assistant (example: butyl carbitol acetate), may be added thereto.

The aqueous latex of the polyolefin-based polymer which can be used in the present invention is commercially available. Specific examples of the commercially available product include BONDINE HX-8210, HX-8290, TL-8030, and LX-4110 (all manufactured by SUMITOMO CHEMICAL Co., Ltd.), ARROW BASE SA-1200, SB-1010, SE-1013N, and SE-1200 (all manufactured by UNITIKA, LTD.), Nippol UFN 1008 (manufactured by ZEON CORPORATION), and the like.

[Cross-Linking Agent]

It is preferable that the interlayer contains a cross-linking agent. The cross-linking agent is used to further improving the adhesion between the ink receiving layer and the support. The cross-linking agent should cause a cross-linking reaction at the time of forming the interlayer, and may not remain in the formed interlayer. That is, in the obtained ink jet recording medium of the present invention, the cross-linking agent may be incorporated into a portion of a cross-linked structure composed of other cross-linked molecules, as a cross-linking agent that has accomplished the reaction or action thereof. Due to the cross-linking agent, the number of cross-linking points between molecules or in molecules in the interlayer is increased. Consequently, the shape restoring properties of the intermediate becomes more reliable, and the adhesion between the interlayer and the ink receiving layer as well as the support is further improved.

As the cross-linking agent contained in the interlayer, an oxazoline-based compound, a carbodiimide-based compound, an epoxy-based compound, an isocyanate-based compound, and a melamine-based compound ($C_3N_6H_6$) are preferable. Plural kinds of these may be contained in the interlayer. As the cross-linking agent, an oxazoline-based compound and a carbodiimide-based compound are particularly preferable. Examples of commercially available products thereof include CARBODILITE V-02-L2 (manufactured by Nisshinbo Chemical Inc.), EPOCROS K-2020E (manufactured by NIPPON SHOKUBAI CO., LTD.), and the like. As the carbodiimide-based compound and the oxazoline-based compound, the same compounds as the cross-linking agent contained in the ink receiving layer can be used, and a preferred scope thereof is also the same. The details of the epoxy-based compound, the isocyanate-based compound, and the melamine-based compound will be described later.

An amount of the cross-linking agent added is preferably 1% to 50% by mass, more preferably 3% to 30% by mass, and even more preferably 5% to 25% by mass.

From the viewpoint generating appropriate cross-links, the amount of the cross-linking agent added is preferably equal to or greater than 1% by mass, and from the economic point of view, the amount of the cross-linking agent added is preferably less than 50% by mass.

—Epoxy-Based Compound—

The epoxy-based compound is a compound which has an epoxy group in a molecule and is obtained as a result of the reaction of the epoxy group. Examples of the compound having an epoxy group in a molecule include a condensate of with a hydroxyl group or an amino group, such as epichlorohydrin, ethylene glycol, polyethylene glycol, glycerin, polyglycerin, or bisphenol A. The compound having an epoxy group in a molecule include a polyepoxy compound, a diepoxy compound, a monoepoxy compound, a glycidyl amine compound, and the like. Examples of the polyepoxy compound include sorbitol polyglycidyl ether, polyglycerol polyglycidyl ether, pentaerythritol polyglycidyl ether, diglycerol polyglycidyl ether, triglycidyl tris(2-hydroxyethyl) isocyanate, glycerol polyglycidyl ether, and trimethylolpropane polyglycidyl ether. Examples of the diepoxy compound include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether, and polytetramethylene glycol diglycidyl ether. Examples of the monoepoxy compound include allylglycidylether, 2-ethylhexyl glycidyl ether, and phenylglycidylether. Examples of the glycidyl amine compound include N,N,N',N',-tetraglycidyl-m-xylylenediamine, 1,3-bis(N,N-diglycidylamino) cyclohexane, and the like. Specific examples of commercially available water-soluble monomers having an epoxy group include DENACOL 614B (sorbitol polyglycidyl ether, epoxy equivalent of 173, trade name, manufactured by Nagase ChemteX Corporation.), DENACOL EX-313 (glycerol polyglycidyl ether, epoxy equivalent of 141, trade name, manufactured by Nagase ChemteX Corporation.), DENACOL EX-521 (polyglycerol polyglycidyl ether, epoxy equivalent of 168, trade name, manufactured by Nagase ChemteX Corporation.), and DENACOL EX-830 (polyethylene glycol diglycidyl ether, epoxy equivalent of 268, trade name, manufactured by Nagase ChemteX Corporation.).

—Isocyanate-Based Compound—

The isocyanate-based compound is a compound having a partial structure of —N=C=O. Examples of organic isocyanate-based compounds include aromatic isocyanate, aliphatic isocyanate, and an isocyanate group-containing resin, and these may be used by being mixed together. Specifically, 4,4'-diphenylmethane diisocyanate, 4,4-diphenyl dimethyl methane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethyl hexamethylene diisocyanate, 4,4'-dicyclohexylmethane diisocyanate, 1,3-phenylene diisocyanate, and the like are used. As organic monoisocyanate, isophorone isocyanate, phenyl isocyanate, cyclohexyl isocyanate, butyl isocyanate, naphthyl isocyanate, and the like are used. Examples of the isocyanate group-containing resin include a self-crosslinking polyurethane resin containing an isocyanate group. The isocyanate-based compound can be obtained as, for example, ELASTRON H-3 (manufactured by DAI-ICHI KOGYO SEIYAKU CO., LTD.), DP9C214 (manufactured by Baxenden Chemicals Ltd.), TAKENATE WD-HS30 (manufactured by Mitsui Chemicals, Inc.), and DURANATE WB-40, DURANATE 17B-60P, DURANATE MF-B60B, and DURANATE WM-44-L70G (manufactured by Asahi-Kasei Chemicals Corporation).

—Melamine-Based Compound—

The melamine-based compound is a compound having two or more methylol groups in a molecule. In the present embodiment, the melamine-based compound can be used without particular limitation. Examples of the melamine-based compound include hexamethylol melamine. Examples of commercially available melamine-based compounds include BECKAMINE PM-N, BECKAMINE J-101, and BECKAMINE M-3 (manufactured by DIC Corporation).

[Others]

If necessary, the interlayer may contain a surfactant, an anti-foaming agent, a foam inhibitor, a dye, a fluorescent whitening agent, particles, a preservative, an insolubilizer, an antistatic agent, a catalyst of a cross-linking agent, and the like, in addition to the resin and the cross-linking agent.

Examples of the catalyst of a cross-linking agent include a catalyst for ELASTRON (manufactured by DAI-ICHI KOGYO SEIYAKU CO., LTD.: trade names CAT-64 and CAT-21) and the like.

As the surfactant, those exemplified above as the component C of the ink receiving layer or as a surfactant other than the component C can be used, and a preferred scope thereof is also the same.

As the lubricant, aliphatic wax or the like is suitably used.

Specific examples of the aliphatic wax include vegetable wax such as carnauba wax, candelilla wax, rice wax, japan wax, jojoba oil, palm wax, rosin-modified wax, ouricury wax, sugar cane wax, esparto wax, and bark wax, animal wax such as beeswax, lanolin, spermaceti, insect wax, and shellac wax, mineral wax such as montan wax, ozokerite, and ceresin wax, petroleum-based wax such as paraffin wax, microcrystalline wax, and petrolatum, synthetic hydrocarbon-based wax such as Fischer-Tropsch wax, polyethylene wax, oxidized polyethylene wax, polypropylene wax, and oxidized polypropylene wax, and the like. Among these, carnauba wax, paraffin wax, and polyethylene wax are particularly preferable. It is preferable that these waxes are used in the form of an aqueous dispersion because then the environmental load can be reduced and the handling of the waxes becomes easy. Examples of commercially available products thereof include CELLOSOLVE 524 and CELLOSOLVE 524-DK (manufactured by CHUKYO YUSHI CO., LTD.), and the like.

One kind of lubricant may be used singly, or two or more kinds thereof may be used in combination.

As the particles, any of organic and inorganic fine particles can be used. For example, it is possible to use polymer particles such as polystyrene, polymethyl methacrylate (PMMA), a silicone resin, or a benzoguanamine resin or inorganic fine particles of silica, calcium carbonate, magnesium oxide, or magnesium carbonate. Examples of commercially available products thereof include cross-linked PMMA particles MR-2G (manufactured by Soken Chemical & Engineering Co., Ltd.), silica particles SEAHOSTAR KE-W10 (manufactured by NIPPON SHOKUBAI CO., LTD.), a SNOWTEX series such as SNOWTEX XL (manufactured by NISSAN CHEMICAL INDUSTRIES, LTD), an AEROSIL series such as AEROSIL OX-50 (manufactured by NIPPON AEROSIL CO., LTD.), a NIPGEL series such as NIPGEL AZ-200 and NIPGEL AZ-204 (manufactured by Tosoh Silica Corporation), PL-3, PL-3-D, PL-1, and PL-7 (manufactured by FUSO CHEMICAL CO., LTD.), and the like. One kind of particles may be used singly, or two or more kinds thereof may be used in combination.

Examples of the preservative include sodium dehydroacetate, sodium benzoate, sodium pyridinethione-1-oxide, ethyl p-hydroxy benzoic acid ester, 1,2-benzothiazolin-3-one, sodium sorbate, pentachlorophenol sodium, and the like.

<Pressure Sensitive Adhesive Layer>

A pressure sensitive adhesive used in the pressure sensitive adhesive layer is not particularly limited as long as it brings two substances into close contact with each other through a pressure sensitive adhesion action. As the pressure sensitive adhesive layer, those described in paragraphs "0069" to "0074" of JP2010-115818A can be used. As the pressure sensitive adhesive, a rubber-based pressure sensitive adhesive, a vinyl polymerization-based pressure sensitive adhesive, a condensation polymerization-based pressure sensitive adhesive, a thermosetting resin-based pressure sensitive adhesive, a silicone-based pressure sensitive adhesive, and the like can be used. Examples of the rubber-based pressure sensitive adhesive include a butadiene-styrene copolymer-based adhesive (SBR), a butadiene-acrylonitrile copolymer-based adhesive (NBR), a chloroprene polymer-based adhesive, an isobutyrene-isoprene copolymer-based adhesive (butyl rubber), and the like.

Examples of the vinyl polymerization-based pressure sensitive adhesive include an acrylic adhesive, a styrene-based adhesive, a vinyl acetate-ethylene copolymer-based adhesive, a vinyl chloride-vinyl acetate copolymer-based adhesive, and the like. Examples of the condensation polymerization-based pressure sensitive adhesive include a polyester-based pressure sensitive adhesive. Examples of the thermosetting resin-based pressure sensitive adhesive include an epoxy resin-based pressure sensitive adhesive, a urethane resin-based pressure sensitive adhesive, a formalin resin-based pressure sensitive adhesive, and the like. Considering excellent transparency, weather fastness, heat resistance, moist heat resistance, substrate adhesiveness, and the like, an acrylic pressure sensitive adhesive is suitably used among the above. Specific examples of the acrylic pressure sensitive adhesive include SK DYNE (registered trademark) 1310 and 1435, SK DYNE 1811L, SK DYNE 1888, SK DYNE 2094, SK DYNE 2096, SK DYNE 2137, SK DYNE 3096, and SK DYNE 1852 manufactured by Soken Chemical & Engineering Co., Ltd., BPS5961, BPS4622, BPS4849-40, BPS6130TF, BPS6078TF, EG354J, BPS5296, and BPS5963 manufactured by TOYOCHEM CO., LTD., and the like.

When used alone, the acrylic pressure sensitive adhesive has weak cohesive force. Therefore, it is preferable that the acrylic pressure sensitive adhesive is cross-linked by a cross-linking agent. As the cross-linking agent, an isocyanate compound, an epoxy compound, an aziridine compound, a metal chelate compound, and the like are suitably used.

In the acrylic pressure sensitive adhesive, a curing accelerator (for example, manufactured by TOYOCHEM CO., LTD., BXX 3778-10 or BXX 4805), a curing retarder (for example, manufactured by TOYOCHEM CO., LTD., BXX 5638), a curing agent (for example, manufactured by TOYOCHEM CO., LTD., BXX 6269), and other additives (like manufactured by TOYOCHEM CO., LTD., BXX 6342 or the) are preferably used.

Furthermore, according to the material of the adherend (glass), a coloring pigment or a coloring dye, an antioxidant, an ultraviolet absorber, a silane coupling agent, a metal deactivator, and the like are suitably added to and formulated with the acrylic pressure sensitive adhesive as appropriate.

A film thickness of the pressure sensitive adhesive layer after drying is preferably 1 to 50 μm, and more preferably 5 to 30 μm.

<Release Film>

Considering workability, it is preferable that the ink jet recording medium of the present invention has a release film on the pressure sensitive adhesive layer. When a printed material using the ink jet recording medium of the present invention is bonded to glass, by peeling the release film from the pressure sensitive adhesive layer and bonding the pressure sensitive adhesive layer to the glass, ornamental glass can be obtained.

As the release film, a film obtained by coating a film substrate such as polyester with a release agent such as silicone is suitably used. Specific examples of such a release film include "CERAPEEL (registered trademark) WZ", CERAPEEL BKE, and CERAPEEL BX8A" manufactured by TORAY ADVANCED FILM Co., Ltd., and the like.

(Method for Manufacturing Ink Jet Recording Medium)

It is preferable that a method for manufacturing an ink jet recording medium of the present invention includes a step of forming an ink receiving layer on one surface of a support, an application step of applying a composition for forming an ink receiving layer onto at least one surface of the support, and a curing step of curing the applied composition for forming an ink receiving layer.

<Application Step>

First, the application step of applying the composition for forming an ink receiving layer onto at least one surface of the support will be described.

In the application step, the composition for forming an ink receiving layer is applied onto at least one surface of the support or onto a surface of the interlayer disposed on one surface of the support. If necessary, the method for manufacturing ink jet recording medium may include, after the curing step which will be described later, a drying step of removing a solvent from the composition for forming an ink receiving layer.

The application of the composition for forming an ink receiving layer is preferably performed by coating which can be conducted using, for example, a blade coater, an air knife coater, a roll coater, a bar coater, a gravure coater, a reverse coater, or a die coater. In a case where the coating is performed by a simultaneous multilayer coating method in which coating is performed by using a plurality of coating solutions without carrying out a drying step, the coating is performed using, for example, a slide bead coater, a slide curtain coater, a curtain flow coater, or an extrusion die coater. Furthermore, for example, the coating may be performed by the "Wet-On-Wet method" (WOW method) described in paragraphs "0016" to "0037" of JP2005-14593A.

An amount of the composition for forming an ink receiving layer used for coating is preferably 3 to 30 $g/m^2$ and more preferably 5 to 10 $g/m^2$, in terms of dry mass.

<Curing Step>

The method for manufacturing an ink jet recording medium of the present invention has the curing step of curing the composition for forming an ink receiving layer applied onto the support.

The curing step is not particularly limited, and the composition may be cured by photopolymerization, thermal polymerization, or a combination of photopolymerization and thermal polymerization. From the viewpoint of accomplishing both of the scratch resistance and the ink adhesiveness, it is preferable that the composition is cured by photopolymerization.

In the method for manufacturing an ink jet recording sheet of the present invention, the polymerization initiator is preferably a photopolymerization initiator, and the step of curing the composition is preferably a curing step in which the composition is irradiated with ultraviolet rays.

In the aforementioned photosensitive curing step of the method for manufacturing an ink jet recording medium of the present invention, an irradiation amount of ultraviolet rays is preferably 10 to 200 $mJ/cm^2$ because then a polymerization rate (curing rate) is lowered, a polymerizable group remains in the polymerizable compound in the ink receiving layer, and the ink adhesiveness becomes excellent, more preferably 30 to 150 $mJ/cm^2$, and particularly preferably 50 to 100 $mJ/cm^2$.

<Step of Forming Interlayer>

In the method for manufacturing an ink jet recording medium of the present invention, the step of forming an interlayer is not particularly limited, and a known method can be used. For example, the interlayer can be suitably prepared by a manufacturing method including a step of coating at least one surface of the support with a coating solution for forming a single interlayer or two or more interlayers in a manner of sequential coating or simultaneous multilayer coating and drying the coating solution such that a single interlayer or two or more interlayers are formed. If necessary, other steps may be additionally performed.

The interlayer formed between the ink receiving layer and the support and the interlayer formed between the pressure sensitive adhesive layer and the support may be simultaneously formed. Specifically, it is preferable that both surfaces of the support are simultaneously coated with the coating solution for forming an interlayer, and the coating solution is then dried.

The method for manufacturing an ink jet recording medium of the present invention preferably includes a first stretching step of stretching a film for a support in a film transport direction or in a direction orthogonal to the film transport direction, a step of coating at least one surface of the film for a support having undergone the first stretching step with the coating solution for forming an interlayer, and a second stretching step of stretching the film for a support coated with the coating solution for forming an interlayer in a direction orthogonal to the stretching direction in the first stretching step such that the support and an interlayer having a thickness of less than 0.1 μm are formed.

By adopting the above constitution, it is possible to manufacture an ink jet recording medium in which the interlayer includes an interlayer A having a thickness of less than 0.1 μm.

The first stretching step is preferably a step of stretching the film in the film transport direction, and the second stretching step is preferably a step of stretching the film in a direction orthogonal to the film transport direction.

In a case where the interlayer A is formed as described above, the stretching ratio in the first stretching step and the second stretching step is not particularly limited, and a preferred range of the stretching ratio in each stretching step is the same as the range described above as a preferred range of the stretching ratio of the support.

An amount of the coating solution, which is used for forming the interlayer, for coating is preferably 5 to 20 g/m$^2$, and more preferably 7 to 10 g/m$^2$.

<Step of Forming Pressure Sensitive Adhesive Layer>

The step of forming a pressure sensitive adhesive layer is not particularly limited, and a known method can be used. For example, the pressure sensitive adhesive layer can be suitably prepared by a manufacturing method including a step of forming a pressure sensitive adhesive layer by coating one surface of the support with a coating solution for forming a pressure sensitive adhesive layer and drying the coating solution. If necessary, other steps may be additionally performed.

The method for preparing the coating solution for forming a pressure sensitive adhesive layer is not particularly limited. The coating solution can be prepared by mixing a main agent of a pressure sensitive adhesive, a solvent, additives, a curing accelerator, a curing retarder, and the like together, and then mixing the resultant with a curing agent.

As the coating and drying methods at the time of forming the pressure sensitive adhesive layer, the same methods as the coating and drying methods for the interlayer can be used. It is preferable that the pressure sensitive adhesive layer is formed by coating the support with the coating solution for forming a pressure sensitive adhesive layer by a wire bar coating method and drying the coating solution in an oven.

A concentration of solid contents in the coating solution for forming a pressure sensitive adhesive layer is preferably 5% to 40% by mass, and more preferably 10% to 20% by mass.

An amount of the coating solution for forming a pressure sensitive adhesive layer for coating is preferably 5 to 500 g/m$^2$, and more preferably 50 to 250 g/m2.

After the support is directly coated or coated through another layer, in order to dry the solvent, the pressure sensitive adhesive layer is preferably held in a heated oven. The drying time is preferably, for example, 1 to 10 minutes.

A temperature of the oven is preferably 80° C. to 140° C. Here, the temperature of the oven is preferably equal to or lower than a temperature at which components other than the solvent contained in the coating composition of the pressure sensitive adhesive layer start to volatilize.

<Step of Forming Release Film>

The step of forming a release film is not particularly limited, and a known method can be used. It is preferable that a release film is laminated on the pressure sensitive adhesive layer and bonded to the pressure sensitive adhesive layer by being pressure-bonded by a roller.

<Winding Step>

The winding step in the method for manufacturing an ink jet recording medium of the present invention is not particularly limited, and the recording medium can be wound in the form of roll by using a known method. Regarding a thickness or material of the winding core, a known resin such as fiber-reinforced plastic (FRP) or an ABS resin can be used. In addition, for example, a winding core may be used which is obtained by coating the outer circumference of a winding core made of FRP with natural rubber, a urethane primer, or the like such that hardness of the winding core is adjusted. It is preferable to use a winding core of which the hardness is reduced due to the FRP coating or the like and which has a hardness of about 30 to 35 measured by, for example, a type A durometer, because then the occurrence of density unevenness resulting from the transfer of the fluorine-based surfactant on the surface of the ink receiving layer is inhibited.

As the layer constitution at the time of winding, for example, a state where the ink receiving layer is formed on one surface of the support or a state where the ink receiving layer is formed on one surface of the support while the pressure sensitive adhesive layer and the release film are formed on the other surface is preferable.

In the winding step of the method for manufacturing an ink jet recording medium of the present invention, a pressure applied to the ink jet recording medium becomes maximum. The maximum pressure, that is, the winding pressure is preferably equal to or less than 0.4 MPa because then the occurrence of density unevenness resulting from the transfer of the fluorine-based surfactant on the surface of the ink receiving layer is inhibited, more preferably equal to or less than 0.25 MPa, and particularly preferably equal to or less than 0.14 MPa. The winding pressure is preferably equal to or greater than 0.05 MPa.

In the winding step, in a case where the winding core has a layer, which allows the ink jet recording medium to absorb a pressure difference, on the surface thereof, the winding pressure is preferably equal to or less than 0.8 MPa because then the occurrence of density unevenness resulting from the transfer of the fluorine-based surfactant on the surface of the ink receiving layer is inhibited, more preferably equal to or less than 0.6 MPa, and particularly preferably equal to or less than 0.4 MPa. The winding pressure is preferably equal to or greater than 0.05 MPa.

Another aspect of the present invention relates to a roll including a winding core and the ink jet recording medium that is wound around the winding core.

(Method for Manufacturing Printed Material)

It is preferable that a method for manufacturing a printed material of the present invention includes a jetting step of jetting an ink composition onto an ink jet recording medium of the present invention, and an image forming step of curing the ink composition by irradiating the jetted ink composition with actinic rays.

The ink composition used in the present invention is not particularly limited as long as it is a known ink composition. The ink composition is preferably an actinic ray-curable type ink composition, and particularly preferably a solventless actinic ray-curable type ink composition not containing a solvent such that the composition is cured after being jetted to the ink jet recording medium of the present invention.

The actinic rays are not particularly limited as long as they can provide energy which can generate an initiation species of a polymerization reaction in the ink composition through the irradiation thereof, and includes a wide variety of rays such as α rays, γ rays, X rays, ultraviolet rays, visible rays, and electron beams. Among these, from the viewpoint of curing sensitivity and ease of availability of the device, ultraviolet rays and electron beams are preferable, and ultraviolet rays are particularly preferable. Accordingly, in the present invention, an ultraviolet-curable type ink composition is particularly preferably used.

Regarding the actinic ray-curable type ink composition, for example, those described in JP2010-47015A and JP1993-214280A (JP-H05-214280A) can be referred to, and the contents of the documents are incorporated into the specification of the present application.

Regarding the solventless actinic ray-curable type ink composition, for example, those described in JP2004-131725A and JP2009-299057A can be referred to, and the contents of the documents are incorporated into the specification of the present application.

Figure 4:
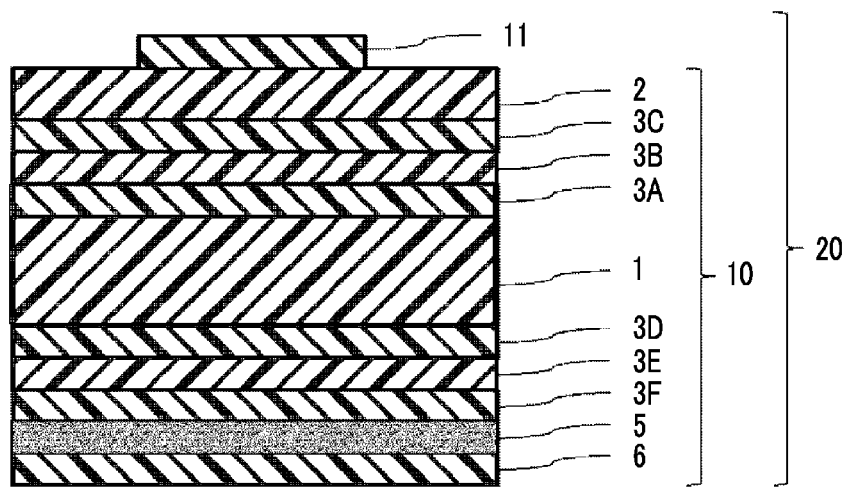
FIG. 4 is a schematic cross-sectional view of an example of a printed material of the present invention.

The method for manufacturing a printed material of the present invention includes the aforementioned step. As a result, an image portion is formed on the ink jet recording sheet by the cured ink composition, and a printed material illustrated in FIG. 4 is formed.

Examples of the ink jet recording device which can be used in the present invention include a device including an ink supply system, a temperature sensor, and a source of actinic rays.

The ink supply system is composed of, for example, a base tank containing the ink composition of the present invention, supply piping, an ink supply tank disposed immediately before an ink jet head, a filter, and a piezo-type ink jet head. The piezo-type ink jet head can be driven such that it can jet multi-sized dots preferably having a size of 1 to 100 pl and more preferably having a size of 8 to 30 pl, preferably at a resolution of 320 dpi×320 dpi to 4,000 dpi×4,000 dpi, more preferably at a resolution of 400 dpi×400 dpi to 1,600 dpi×1,600 dpi, and even more preferably at a resolution of 720 dpi×720 dpi to 1,600 dpi×1,600 dpi. Herein, dpi mentioned in the present invention represents the number of dots per 2.54 cm (dots per inch).

It is preferable that an ink such as an actinic ray-curable type ink is kept at a constant temperature when being jetted. Therefore, it is preferable that the ink jet recording device includes means for stabilizing the temperature of the ink composition. The site to be kept at a constant temperature includes a piping system from an ink tank (in a case where the device has an intermediate tank, the intermediate tank) to the jetting surface of a nozzle and all members. That is, the area from the ink supply tank to the ink jet head portion can be insulated and heated.

The temperature control method is not particularly limited. For example, it is preferable to provide a plurality of temperature sensors to the respective piping portions so as to control heating according to the flow rate of the ink and the environmental temperature. The temperature sensor can be provided in the ink supply tank and in the vicinity of the nozzle of the ink jet head. Moreover, it is preferable that the head unit to be heated is a heat-blocking unit or is thermally insulated, such that the body of the device is not influenced by the temperature of external air. In order to shorten printer startup time taken for heating or to reduce thermal energy loss, it is preferable to insulate the heating unit from other sites and to reduce a total thermal capacity of the heating unit.

It is preferable that the ink composition is jetted by using the ink jet recording device described above, after the ink composition is heated preferably to 25° C. to 80° C. and more preferably to 25° C. to 50° C. and the viscosity of the ink composition is reduced preferably into 3 to 15 mPa·s and more preferably into 3 to 13 mPa·s. In the present invention, it is particularly preferable to use an ink composition having ink viscosity of equal to or less than 50 mPa·s at 25° C., because such an ink composition can be excellently jetted. If the aforementioned method is used, high jetting stability can be realized.

Usually, the viscosity of the actinic ray-curable type ink composition is higher than the viscosity of an aqueous ink that is generally used as an ink for ink jet recording. Accordingly, the viscosity of the ink composition greatly varies with the temperature at the time of jetting. The variation in the viscosity of the ink composition exerts a great influence on the change in the liquid droplet size and on the change in the jetting rate of the liquid droplets, and results in the deterioration of image quality. Therefore, it is important for the temperature of the ink composition at the time of jetting to be kept as constant as possible. Consequently, in the present invention, it is appropriate for the temperature of the ink composition to be controlled preferably within a range of a set temperature ±5° C., more preferably within a range of a set temperature ±2° C., and even more preferably within a range of a set temperature ±1° C.

Next, the step of curing the ink composition by irradiating the jetted ink composition with actinic rays will be described.

The ink composition jetted onto the ink jet recording medium of the present invention is cured by being irradiated with actinic rays. This is because the radical polymerization initiator contained in the ink composition is decomposed by being irradiated with the actinic rays and thus generates radicals, and the radicals cause and accelerate a polymerization reaction of a radical polymerizable compound. At this time, if both of the radical polymerization initiator and the sensitizer are present in the ink composition, the sensitizer in the system is excited by absorbing the actinic rays and contacts the radical polymerization initiator. As a result, decomposition of the radical polymerization initiator is accelerated, and thus a curing reaction with higher sensitivity can occur.

A peak wavelength of the actinic rays used depends on the absorption characteristics of the sensitizer. However, the peak wavelength is preferably 200 to 600 nm, more preferably 300 to 450 nm, and even more preferably 350 to 420 nm.

The ink composition exhibits sufficient sensitivity even when low-power ultraviolet rays are used. Therefore, it is appropriate for the ink composition to be cured at an illuminance of an exposure surface of preferably 10 to 4,000 mW/cm$^2$ and more preferably 20 to 2,500 mW/cm$^2$.

As a source of ultraviolet rays, a mercury lamp, a gas or solid laser, and the like are mainly used. Furthermore, as a light source used for curing an ultraviolet-curable type ink jet recording ink, a mercury lamp or a metal halide lamp is widely known. However, currently, from the viewpoint of environmental protection, it is strongly desired not to use mercury. Therefore, in view of industrial and environmental aspects, it is extremely useful to replace the mercury lamp with a GaN-based semiconductor ultraviolet light emitting device. In addition, LED (UV-LED) and LD (UV-LD) are expected to be used as a light source for a photocuring type ink jet recording since these devices are compact, have a long service life and high efficiency, and are low-cost.

Moreover, a light emitting diode (LED) and a laser diode (LD) can be used as the source of ultraviolet rays. Particularly, in a case where the source of ultraviolet rays is required, an ultraviolet LED and an ultraviolet LD can be used. For example, NICHIA CORPORATION put an ultraviolet LED, of which the main emission spectrum has a wavelength between 365 nm and 420 nm, on the market. In a case where a shorter wavelength is required, the LED disclosed in U.S. Pat. No. 6,084,250A that can emit ultraviolet rays having emission energy maximum between 300 nm and 370 nm can be considered. Furthermore, other ultraviolet LEDs are available and can emit radiation of different ultraviolet bands. A UV-LED is a source ultraviolet rays that is particularly preferred in the present invention. Particularly, a UV-LED having a peak wavelength at 350 to 420 nm is preferable.

A maximum illuminance of the LED on a recording medium is preferably 10 to 2,000 mw/cm$^2$, more preferably 20 to 1,000 mW/cm$^2$, and particularly preferably 50 to 800 mW/cm$^2$.

It is appropriate for the ink composition to be irradiated with the ultraviolet rays described above preferably for 0.01 to 120 seconds, and more preferably for 0.1 to 90 seconds.

The irradiation conditions and the basic irradiation method of the ultraviolet rays are disclosed in JP1985-132767A (JP-S60-132767A). Specifically, a light source is disposed on both sides of a head unit including an ink jet device, and the head unit and the light source are scanned by a so-called shuttle method to perform the irradiation of the ultraviolet rays. The irradiation of the ultraviolet rays is performed for a certain period of time (preferably for 0.01 to 0.5 seconds, more preferably for 0.01 to 0.3 seconds, and even more preferably for 0.01 to 0.15 seconds) after the ink is jetted. If the time period from the jetting of the ink to the irradiation is controlled to be within an extremely short period of time, it is possible to prevent the ink having been jetted to a recording medium from causing bleeding before being cured. Furthermore, it is preferable to shorten the aforementioned time period because, even when a porous recording medium is used, the ink can be exposed to light before it permeates the recording medium into a deep portion that the light source does not reach, and therefore an unreacted monomer is prevented from remaining.

In addition, the curing may be completed by using another light source that is not driven. WO99/54415A discloses a method of using optical fiber and a method of irradiating a recording portion with UV light by putting a collimated light source to a mirror surface disposed on a lateral surface of the head unit. These curing methods can also be applied to the manufacturing method of the present invention.

The ink jet recording device using an ink jet recording medium preferably uses a wide format ink jet printer system and more preferably uses a wide format UV ink jet printer system. The wide format ink jet printer system is a system in which the jetting of the ink composition from the ink jet recording device is performed substantially simultaneously with the irradiation of actinic rays so as to cure the jetted ink composition. Such a system can prepare a large-sized printed material within a short period of time. The wide format printer is generally defined as a printer which can perform printing at a width of equal to or greater than 24 inches (61 cm). Most of such printers perform printing at a width of 44 inches (111.7 cm) to 64 inches (162.5 cm), but some of them can perform printing at a width of up to 197 inches (500 cm).

As the wide format UV ink jet printer system, it is possible to use a LuxelJet UV360 GTW/XTW and UV550 GTW/XTW series and Acuity LED 1600 (all manufactured by FUJIFILM Corporation), inca SP320/SP320e/SP320S/SP320W (manufactured by Inca Digital Printers Ltd.), and the like.

In the method for manufacturing a printed material of the present invention, an ink set including the ink composition can be preferably used. For example, it is possible to use an ink set which is a combination of a yellow ink composition, a cyan ink composition, a magenta ink composition, and a black ink composition. In order to obtain a full color image by using the ink composition, it is preferable to use an ink set which is a combination of dark color ink compositions of four colors consisting of yellow, cyan, magenta, and black. It is more preferable to use an ink set which is a combination of a group of dark color ink compositions of five colors consisting of yellow, cyan, magenta, black, and white and a group of ink compositions of light cyan and light magenta. Herein, the "dark color ink composition" means an ink composition in which a content of a pigment is greater than 1% by mass with respect to the total amount of the ink composition.

In order to obtain a color image by the method for manufacturing a printed material of the present invention, it is preferable to use ink compositions (ink set) of the respective colors and superpose the ink compositions on each other sequentially from the color with high brightness. Specifically, in a case where an ink set composed of ink compositions of yellow, cyan, magenta, and black is used, it is preferable to apply the ink compositions onto the ink jet recording medium of the present invention in order of yellow→cyan→magenta→black. In a case where an ink set is used which has at least a total of seven colors that is composed of a group of ink compositions of light cyan and light magenta and a group of dark color ink compositions of cyan, magenta, black, white, and yellow, it is preferable to apply the ink compositions onto the ink jet recording medium of the present invention in order of white→light cyan→light magenta→yellow→cyan→magenta→black.

In this case, by superposing the inks on each other as described above sequentially from an ink with high brightness, the radiated actinic rays easily reach down to the ink in the lower portion. Consequently, it is possible to expect excellent curing sensitivity, reduction of residual monomers, and improvement of adhesiveness. Herein, the order of superposing the respective ink compositions (ink set) on each other may be appropriately changed in consideration of physical properties such as viscosity or light fastness of the ink compositions used.

All the color inks can be simultaneously jetted and simultaneously exposed by the irradiation. However, from the viewpoint of accelerating curing, it is preferable to expose the inks to light one by one.

(Printed Material)

A printed material of the present invention is a printed material obtained by the method for manufacturing a printed material of the present invention.

The constitution of the printed material of the present invention will be described based on a drawing.

An image portion 11 is formed on the ink jet recording medium 10 of the present invention, and in this way, an aspect of the printed material 20 of the present invention as illustrated in FIG. 4 is obtained.

The printed material of the present invention is a high-quality printed material which is excellent in the ink adhesiveness and the scratch resistance of the ink receiving layer 2 of the image portion 11 and a non-image portion. The non-image portion (not shown in the drawing) refers to a portion other than the image portion 11 within the ink receiving layer 2 (that is, the ink receiving layer 2 in a portion in which an image is not formed).

A thickness of the image portion 11 is preferably 1 μm to 2 mm, and more preferably 1 to 800 μm.

A width of the printed material is not particularly limited, but is preferably set such that the printed material can be recorded by the wide format ink jet printer system. The width of the printed material is preferably 0.3 to 5 m, more preferably 0.5 to 4 m, and particularly preferably 1 to 3 m. A preferred width of the ink jet recording medium of the present invention is the same as the preferred width of the printed material of the present invention.

(Ornamental Glass)

Ornamental glass of the present invention includes glass and the printed material of the present invention disposed on the glass. The constitution of the ornamental glass of the present invention will be described based on a drawing.

Figure 5:
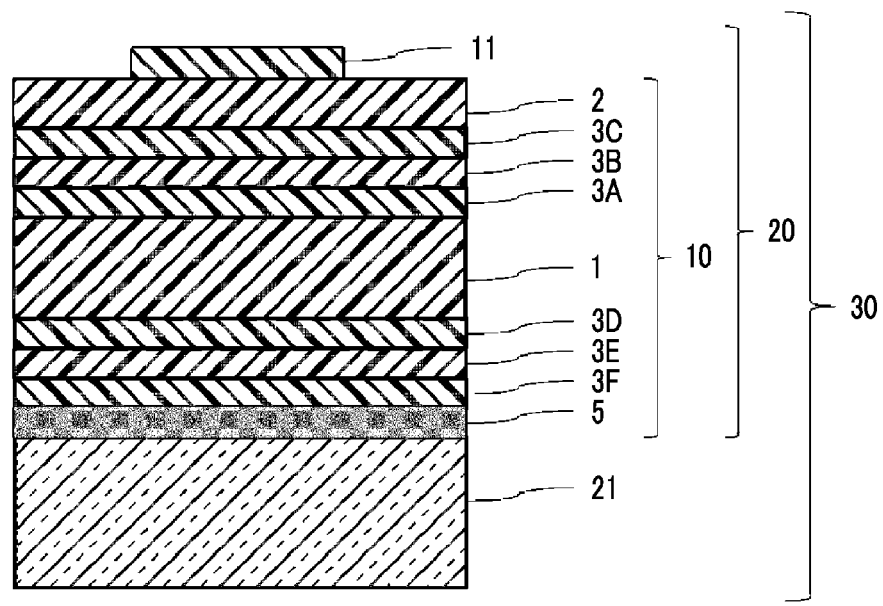
FIG. 5 is a schematic cross-sectional view of an example of ornamental glass of the present invention.

Ornamental glass 30 of the present invention includes glass 21 and a printed material of the present invention disposed on the glass 21. In this way, an aspect as illustrated in FIG. 5 is obtained. The ornamental glass of the present invention is high-quality ornamental glass which is excellent in the ink adhesiveness and the scratch resistance of the ink receiving layer 2 of the image portion 11 and the non-image portion.

The glass used in the ornamental glass of the present invention is not particularly limited, and known glass can be used.

A method for manufacturing ornamental glass of the present invention is not particularly limited. It is preferable that the release film is peeled from the pressure sensitive adhesive layer of the printed material of the present invention, and then the pressure sensitive adhesive layer is bonded to glass in a state where the image portion is on the side opposite to the glass.

It is preferable to remove dirt·contaminants attached to the glass by using a cleaning roller, a cleaning wiper, or the like before the pressure sensitive adhesive layer is bonded to the glass. In a case where the contaminants are not removed, it is preferable to wipe the glass with a sanitary wiper containing alcohol.

Furthermore, it is preferable to remove dirt·contaminants attached to the surface of the printed material opposite to the image portion by using a cleaning roller, a cleaning wiper, or the like.

After the glass is bonded to the printed material, it is preferable to remove air from the image portion by using a cleaning roller, a cleaning wiper, or the like.

Examples of the aspects in which the ornamental glass of the present invention is used include show windows, automatic doors, glass shades, and the like.

EXAMPLES

Hereinafter, the present invention will be more specifically described based on examples. The materials, the amount thereof used, the proportions of thereof, the treatment contents, the treatment sequence, and the like shown in the following examples can be appropriately modified within a scope that does not depart from the gist of the present invention. Therefore, the scope of the present invention is not limited to the following specific examples.

In the following examples and comparative examples, unless otherwise specified, "part" and "%" means "part by mass" and "% by mass".

Example 1

<Formation of Ink Receiving Layer>

By using a die coater, a support (COSMOSHINE A4300-50, manufactured by Toyobo Co., Ltd., a polyethylene terephthalate film with a total light transmittance of 92.3% of which the both surfaces had undergone an easy adhesion treatment) was coated with a coating solution (composition for forming an ink receiving layer) prepared to have the following composition, and dried for 60 seconds at 60° C. Then, under nitrogen purging, the support was irradiated with ultraviolet rays at 77 mJ/cm$^2$ by using an air-cooled metal halide lamp at 160 W/cm (manufactured by EYE GRAPHIC Co., Ltd.) such that the coating layer was cured, thereby forming an ink receiving layer and a laminate provided with a support and the ink receiving layer in this order.

At this time, coating was performed such that a coating thickness of the ink receiving layer after drying became 5 μm.

[Composition of Coating Solution G-1]

| | |
|---|---|
| Polymerizable compound (acryl monomer) (KARAYAD PET-30, pentaerythritol acrylate, manufactured by Nippon Kayaku Co., Ltd.) | 300 parts by mass |
| Polymerizable compound (acryl monomer) (VISCOAT V360, trimethylolpropane EO-modified triacrylate, manufactured by OSAKA ORGANIC CHEMICAL INDUSTRY LTD.) | 180 parts by mass |
| Cellulose acetate butyrate (manufactured by Eastman Chemical Japan Ltd., CAB) | 7.35 parts by mass |
| Polymerization initiator (IRGACURE-127 manufactured by BASF SE) | 16.6 parts by mass |
| Fluorine-based surfactant (GF-1: compound represented by a structural formula which will be described later) | 0.0600 parts by mass |
| Solvent (manufactured by Mitsui Chemicals, Inc., methyl isobutyl ketone (MIBK)) | 348 parts by mass |
| Solvent (manufactured by TonenGeneral Sekiyu K.K., methyl ethyl ketone (MEK)) | 148 parts by mass |

<Coating for Pressure Sensitive Adhesive Layer>

By a die coating method, a side of the support that was opposite to the ink receiving layer side was coated with a coating solution H-1 for a pressure sensitive adhesive layer, and the coating solution H-1 was dried for 2 minutes in an oven at 100° C., thereby forming a pressure sensitive adhesive layer. The coating was performed by using the following coating solution H-1 having a concentration of solid contents of 25% with an appropriately selected bar coater such that the film thickness after drying became about 25 μm, thereby forming a laminate in which the pressure sensitive adhesive layer, the support, and the ink receiving layer were provided in this order.

The coating solution H-1 was prepared by the following method. 100 parts by mass of a main agent (manufactured by TOYOCHEM CO., LTD., BPS 5296) and 50 parts by mass of a solvent (ethyl acetate) were mixed together for 30 minutes. Then, 2.0 parts by mass of a curing agent (manufactured by TOYOCHEM CO., LTD., BHS 8515) was added thereto, followed by mixing for 30 minutes, thereby obtaining the coating solution H-1.

<Bonding of Release Film>

A release film (manufactured by TORAY ADVANCED FILM Co., Ltd., CERAPEEL BKE) having a thickness of 38 μm was laminated on the pressure sensitive adhesive layer.

As a laminating method, the release film was bonded to the pressure sensitive adhesive layer by being pressure-bonded to the pressure sensitive adhesive layer by using a roller.

A laminate obtained in this way in which the release film, the pressure sensitive adhesive layer, the support, and the ink receiving layer were provided in this order was used as an ink jet recording medium of Example 1.

<Maximum Pressure Applied>

A winding core made of FRP having an inner diameter of 6 inches (inner diameter: 152.5 mm, outer diameter: 169.6 mm) was used. The dirt and contaminant that had adhered to the winding core were removed by a cleaning wiper or the like. In a case where the contaminant was not removed, the winding core was wiped with a cleaning wiper impregnated with a solvent such as ethanol.

A film provided only with an ink receiving layer was cut in a straight line along a width direction. The cut surface of the leading end portion of the film was fixed to the winding core by using a pressure sensitive adhesive tape (NO. 31B manufactured by NITTO DENKO CORPORATION, thickness: 80 μm, width: 25 mm) such that the ink receiving layer became an outer circumferential side.

The film was wound in a state where back tension was applied thereto such that a maximum pressure of the portion of winding core became 0.14 MPa. The pressure of the portion of winding core was measured by inserting a tactile sensor (manufactured by NITTA Corporation) into the portion of winding core.

One week after the film was wound, the roll was wound off, and a position 0.3 to 5 m distant from the winding core was collected as a sample for image printing.

<Printing of Image Portion>

As inks, solventless actinic ray-curable type inks (manufactured by FUJIFILM Specialty Ink System Ltd., lot number: UVIJET KO 021 White, UVIJET KO 004 Black, UVIJET KO 215 Cyan, UVIJET KO 867 Magenta, UVIJET KO 052 Yellow) were used.

By using a "wide format UV ink jet press LuxelJet UV550XTW, manufactured by FUJIFILM Corporation" as a printer, a color image was printed once (concentration for ink adhesiveness evaluation: 100%, concentration for density unevenness evaluation: 20%) on the ink receiving layer G of the ink jet recording medium of Example 1 in a flat bed-type Quality Layered mode (wavelength: 365 nm to 405 nm, printing speed: 22 m²/hr) so as to form an image portion, thereby obtaining a printed material of Example 1 having a size of about 2 m (width)×1.5 m.

<Formation of Ornamental Glass (Bonding to Glass before Measuring Pencil Hardness)>

By using a cleaning roller, a cleaning wiper, or the like, dirt•contaminants that had adhered to glass (EAGLE XG glass manufactured by Corning Incorporated, 158 mm×88 mm×1.1 mm) were removed. When the contaminants were not removed, they were wiped with a sanitary wiper with alcohol. Furthermore, dirt•contaminants that had adhered to the surface of the printed material of Example 1 opposite to the image portion were removed by using a cleaning roller, a cleaning wiper, or the like. The release film was peeled from the printed material of Example 1, the glass was then bonded to the pressure sensitive adhesive layer in a state where the image portion was on the side opposite to the glass, and a tape having a width of 18 mm was bonded thereto. By using a cleaning roller, a cleaning wiper, or the like, air was removed from the image portion, and the obtained ornamental glass was used as ornamental glass of Example 1.

Examples 2 to 4 and 7 to 10

Ink jet recording media, printed materials, and ornamental glass of Examples 2 to 4 and 7 to 10 were obtained in the same manner as in Example 1, except that the coating solution G-1 of Example 1 was changed to G-2 to G-8 shown below.

The composition of each of the coating solutions G-2 to G-8 is as below.

[Composition of Coating Solution G-2]

A coating solution G-2 was prepared in the same manner as used for preparing the coating solution G-1, except that the amount of the fluorine-based surfactant (GF-1) in the coating solution G-1 was changed to 0.121 parts by mass.

[Composition of Coating Solution G-3]

A coating solution G-3 was prepared in the same manner as used for preparing the coating solution G-1, except that the amount of the fluorine-based surfactant (GF-1) in the coating solution G-1 was changed to 0.181 parts by mass.

[Composition of Coating Solution G-4]

A coating solution G-4 was prepared in the same manner as used for preparing the coating solution G-1, except that the amount of the fluorine-based surfactant (GF-1) in the coating solution G-1 was changed to 0.600 parts by mass.

[Composition of Coating Solution G-5]

A coating solution G-5 was prepared in the same manner as used for preparing the coating solution G-1, except that the fluorine-based surfactant (GF-1) in the coating solution G-1 was changed to a fluorine-based surfactant (G-2).

[Composition of Coating Solution G-6]

A coating solution G-6 was prepared in the same manner as used for preparing the coating solution G-5, except that the amount of the fluorine-based surfactant (GF-2) in the coating solution G-5 was changed to 0.121 parts by mass.

[Composition of Coating Solution G-7]

A coating solution G-7 was prepared in the same manner as used for preparing the coating solution G-5, except that the amount of the fluorine-based surfactant (GF-2) in the coating solution G-5 was changed to 0.181 parts by mass.

[Composition of Coating Solution G-8]

A coating solution G-8 was prepared in the same manner as used for preparing the coating solution G-1, except that the fluorine-based surfactant (GF-1) in the coating solution G-1 was a fluorine-based surfactant (GF-3) mass.

Example 5

An ink jet recording medium, a printed material, an ornamental glass were obtained in the same manner as in Example 4, except that the maximum pressure at the time of winding was set to be equal to or less than 0.4 MPa by increasing the back tension at the time of winding.

Example 6

The outer circumference of a winding core made of FRP was coated with natural rubber certified by Forest Stewardship Council and a urethane primer (ATORENU manufactured by Atomix Co., Ltd.) such that a coat having a thickness of 3 mm was formed. A hardness of the winding core measured by a type A durometer was 30 to 35.

Furthermore, an ink jet recording medium, a printed material, and ornamental glass were obtained in the same manner as in Example 4, except that the maximum pressure at the time of winding was set to be 0.4 MPa.

Example 11

A polyethylene terephthalate (hereinafter, described as PET) resin, which was polycondensed using a Ti compound as a catalyst and had an intrinsic viscosity of 0.64 (dl/g, the resin was dissolved in a mixed solvent of 1,1,2,2-tetrachloroethane/phenol (=⅔ [mass ratio]), and the viscosity was determined from a solution viscosity at 25° C. in the mixed solvent), was dried until the moisture content thereof became equal to or less than 50 ppm, and melted in an extruder in which a heater temperature was set to be 270° C. to 300° C. The melted PET was extruded from a die portion onto a chill roll to which static electricity was applied, thereby obtaining a belt-like amorphous base. The obtained belt-like amorphous base was stretched by 3.3-fold in a longitudinal direction and then stretched by 3.8-fold in a width direction, thereby obtaining a transparent support having a thickness of 50 μm.

Both surfaces of the support were coated with the following coating solution B-1 by a bar coating method, dried for 1 minute at 145° C., and subjected to a corona discharge treatment under a condition of 288 J/m². Thereafter, the both surfaces were coated with the following coating solution C-1 by a bar coating method. The coating solution was dried for 1 minute at 145° C. such that the both surfaces of the support were provided with the interlayers B and E formed by drying the coating solution B-1 and the interlayers C and F formed by drying the coating solution C-1, thereby obtaining a laminate provided with the interlayer F, the interlayer E, the support, the interlayer B, and the interlayer C in this order. The interlayers B and E and the interlayers C and F had a coating thickness of 0.3 μm respectively after drying.

The composition of the coating solution B-1 was as below.

[Coating Solution B-1]

| | |
|---|---|
| Acrylic acid ester copolymer (JURYMER ET-410, solid content: 30%, manufactured by TOAGOSEI CO., LTD.) | 31.1 parts by mass |
| Polyolefin (ARROW BASE SE-1013N, solid content: 20%, manufactured by UNITIKA, LTD.) | 108.8 parts by mass |
| Cross-linking agent (carbodiimide compound) (CARBODILITE V-02-L2, solid content: 40%, manufactured by Nisshinbo Chemical Inc.) | 25.7 parts by mass |
| Surfactant A (1% aqueous solution of NAROACTY CL-95 (manufactured by Sanyo Chemical Industries, Ltd.)) | 20.4 parts by mass |
| Surfactant B (1% aqueous solution of RAPISOL B-90 (manufactured by NOF CORPORATION)) | 8.5 parts by mass |
| Aqueous dispersion of polystyrene latex (NIPPOL UFN 1008, manufactured by ZEON CORPORATION) | 1.2 parts by mass |
| Colloidal silica (SNOWTEX XL, manufactured by NISSAN CHEMICAL INDUSTRIES, LTD.) | 10.3 parts by mass |
| Distilled water | α parts by mass |

(α: an amount of distilled water was regulated such that an amount of the coating solution B-1 became 1,000 parts by mass in total.)

The composition of the coating solution C-1 is as follows.

[Coating Solution C-1]

| | |
|---|---|
| Aqueous solution of polyester resin (PLAS COAT Z687, solid content: 25%, manufactured by GOO CHEMICAL CO., LTD.) | 51.2 parts by mass |
| Aqueous solution of polyurethane resin (OLESTER UD350, solid content: 38%, manufactured by Mitsui Chemicals, Inc.) | 33.7 parts by mass |
| Cross-linking agent (carbodiimide compound) (CARBODILITE V-02-L2, solid content: 40%, manufactured by Nisshinbo Chemical Inc.) | 13.9 parts by mass |
| Surfactant A (1% aqueous solution of NAROACTY CL-95 (manufactured by Sanyo Chemical Industries, Ltd.)) | 45.7 parts by mass |
| Surfactant B (1% aqueous solution of RAPISOL B-90 (manufactured by NOF CORPORATION)) | 37.4 parts by mass |
| Lubricant (carnauba wax dispersion CELLOSOL 524, solid content: 30%, manufactured by CHUKYO YUSHI CO., LTD.) | 2.0 parts by mass |
| Distilled water | α parts by mass |

(α: an amount of distilled water was regulated such that an amount of the coating solution C-1 became 1,000 parts by mass in total.)

<Formation of Ink Receiving Layer>

The interlayer C was coated with the coating solution G-2 by using a die coater, and the coating solution was dried for 60 seconds at 60° C. Then, under nitrogen purging, by using an air-cooled metal halide lamp (manufactured by EYE GRAPHIC Co., Ltd.) at 160 W/cm, the coating solution was irradiated with ultraviolet rays at 77 mJ/cm² such that the coating layer was cured, thereby forming an ink receiving layer and a laminate provided with the interlayer F, the interlayer E, the transparent support, the interlayer B, the interlayer C, and the ink receiving layer in this order.

At this time, coating was performed such that a coating thickness of the ink receiving layer after drying became 5 μm.

<Coating for Pressure Sensitive Adhesive Layer>

By a die coating method, the interlayer F that was on the side opposite to the ink receiving layer was coated with a coating solution H-2 for a pressure sensitive adhesive layer, and the coating solution was dried for 2 minute at 100° C. in an oven, thereby forming a pressure sensitive adhesive layer. The resultant was then coated with the following coating solution H-1 having a concentration of solid contents of 25% by a bar coater appropriately selected such that a film thickness after drying became 25 μm, thereby obtaining a laminate provided with the pressure sensitive adhesive layer, the interlayer F, the interlayer E, the transparent support, the interlayer B, the interlayer C, and the ink receiving layer in this order.

The coating solution H-2 was prepared by the following method. 100.0 parts by mass of a main agent (manufactured by TOYOCHEM CO., LTD., BPS 6078TF), 200.0 parts by mass of a solvent (ethyl acetate), 0.1 parts by mass of a curing accelerator (manufactured by TOYOCHEM CO., LTD., BXX 3778-10), and 1.0 part by mass of a curing retarder (manufactured by TOYOCHEM CO., LTD., BXX 5638) were mixed together for 30 minutes. Thereafter, 5.0 parts by mass of a curing agent (manufactured by TOYOCHEM CO., LTD., BXX 6269) was added thereto, followed by mixing for 30 minutes, thereby obtaining the coating solution H-2.

The bonding of a release film, the printing of an image portion, and the formation of ornamental glass were performed in the same manner as in Example 1, thereby obtaining an ink jet printing medium, a printed material, and ornamental glass.

Example 12

An ink jet recording sheet, a printed material, and ornamental glass of Example 12 were obtained in the same manner as in Example 1, except that the coating solutions B-1 and C-1 of Example 11 were changed to the following coating solutions B-2 and C-2, and the coating thickness of each of the obtained interlayers B and E and the interlayers C and F was changed to 0.4 μm.

The composition of the coating solution B-2 is as follows.
(Coating Solution B-2)

| | |
|---|---|
| Acrylic acid ester copolymer (JURYMER ET-410, solid content: 30%, manufactured by TOAGOSEI CO., LTD.) | 50.4 parts by mass |
| Polyolefin (ARROW BASE SE-1013N, solid content: 20% by mass, manufactured by UNITIKA, LTD.) | 113.4 parts by mass |
| Cross-linking agent (carbodiimide compound) (CARBODILITE V-02-L2, solid content: 40%, manufactured by Nisshinbo Chemical Inc.) | 31.5 parts by mass |
| Surfactant A (1% aqueous solution of NAROACTY CL-95 (manufactured by Sanyo Chemical Industries, Ltd.)) | 16.7 parts by mass |
| Surfactant B (1% aqueous solution of RAPISOL B-90 (manufactured by NOF CORPORATION)) | 6.9 parts by mass |
| Aqueous dispersion of polystyrene latex (NIPPOL UFN 1008, manufactured by ZEON CORPORATION) | 1.2 parts by mass |
| Preservative (1,2-Benzothiazolin-3-one, solid content: 3.5%, methanol solvent manufactured by DAITO CHEMICAL CO., LTD.,) | 0.8 parts by mass |
| Distilled water | α parts by mass |

(α: an amount of distilled water was regulated such that an amount of the coating solution B-2 became 1,000 parts by mass in total.)

The composition of the coating solution C-2 is as follows.
[Coating Solution C-2]

| | |
|---|---|
| Aqueous solution of polyester resin (PLAS COAT Z592, solid content: 25%, manufactured by GOO CHEMICAL CO., LTD.) | 119.3 parts by mass |
| Aqueous dispersion of polyurethane resin (SUPERFLEX 150HS, solid content: 38%, manufactured by DAI-ICHI KOGYO SEIYAKU CO., LTD.) | 78.5 parts by mass |
| Cross-linking agent (oxazoline compound) (EPOCROS K-2020E, solid content: 40%, manufactured by NIPPON SHOKUBAI CO., LTD.) | 5.3 parts by mass |
| Surfactant A (1% aqueous solution of NAROACTY CL-95 (manufactured by Sanyo Chemical Industries, Ltd.)) | 40.8 parts by mass |
| Surfactant B (1% aqueous solution of RAPISOL B-90 (manufactured by NOF CORPORATION)) | 16.9 parts by mass |
| Lubricant (Carnauba wax dispersion CELLOSOL 524, solid content: 30%, manufactured by CHUKYO YUSHI CO., LTD.) | 2.3 parts by mass |
| Preservative (1,2-Benzothiazolin-3-one, solid content: 3.5%, methanol solvent, manufactured by DAITO CHEMICAL CO., LTD.) | 1.0 part by mass |
| Distilled water | α parts by mass |

(α: an amount of distilled water was regulated such that an amount of the coating solution C-2 became 1,000 parts by mass in total.)

Example 13

An ink jet recording sheet, a printed material, and ornamental glass of Example 13 were obtained in the same manner as in Example 11, except that the coating solutions B-1 and C-1 of Example 11 were changed to the following coating solutions B-3 and C-3, and the coating thickness of each of the obtained interlayers B and E and interlayers C and F was changed to 0.4 μm.

The composition of the coating solution B-3 is as follows.
[Coating Solution B-3]

| | |
|---|---|
| Aqueous solution of polyester resin (PLAS COAT Z687, solid content: 25%, manufactured by GOO CHEMICAL CO., LTD.) | 139.7 parts by mass |
| Cross-linking agent (carbodiimide compound) (CARBODILITE V-02-L2, solid content: 40%, manufactured by Nisshinbo Chemical Inc.) | 78.3 parts by mass |
| Surfactant A (1% aqueous solution of NAROACTY CL-95 (manufactured by Sanyo Chemical Industries, Ltd.)) | 16.7 parts by mass |
| Surfactant B (1% aqueous solution of RAPISOL B-90 (manufactured by NOF CORPORATION)) | 6.9 parts by mass |
| Aqueous dispersion of polystyrene latex (Nippol UFN1008, manufactured by ZEON CORPORATION) | 1.2 parts by mass |
| Preservative (1,2-Benzothiazolin-3-one, solid content: 3.5%, methanol solvent, manufactured by DAITO CHEMICAL CO., LTD.) | 0.8 parts by mass |
| Distilled water | α parts by mass |

(α: an amount of distilled water was regulated such that an amount of the coating solution B-3 became 1,000 parts by mass in total.)

The composition of the coating solution C-3 is as follows.
[Coating Solution C-3]

| | |
|---|---|
| Aqueous solution of polyester resin (PLAS COAT Z592, solid content: 25%, manufactured by GOO CHEMICAL CO., LTD.,) | 77.7 parts by mass |
| Aqueous dispersion of polyurethane resin (SUPERFLEX 150HS, solid content: 38%, manufactured by DAI-ICHI KOGYO SEIYAKU CO., LTD.) | 51.1 parts by mass |
| Cross-linking agent (oxazoline compound) (EPOCROS K-2020E, solid content: 40%, manufactured by NIPPON SHOKUBAI CO., LTD.) | 15.4 parts by mass |

-continued

| | |
|---|---|
| Surfactant A<br>(1% aqueous solution of NAROACTY CL-95<br>(manufactured by Sanyo Chemical Industries,<br>Ltd.)) | 29.7 parts by mass |
| Surfactant B<br>(1% aqueous solution of RAPISOL B-90<br>(manufactured by NOF CORPORATION)) | 12.3 parts by mass |
| Lubricant (Carnauba wax dispersion<br>CELLOSOL 524, solid content: 30%,<br>manufactured by CHUKYO YUSHI CO., LTD.) | 1.7 parts by mass |
| Preservative (1,2-Benzothiazolin-3-one solid<br>content: 3.5%, methanol solvent, manufactured<br>by DAITO CHEMICAL CO., LTD.) | 0.7 parts by mass |
| Distilled water | α parts by mass |

(α: an amount of distilled water was regulated such that an amount of the coating solution C-3 became 1,000 parts by mass in total.)

Example 14

A transparent support manufactured in the same manner as in Example 11 was transported at a transport rate of 105 m/min, and both surfaces thereof were subjected to a corona discharge treatment under a condition of 955 J/m² and then coated with the following coating solution B-4 by a bar coating method. Thereafter, the coating solution B-4 was dried for 1 minute at 145° C., thereby obtaining a laminate in which interlayers B and E formed by drying the coating solution B-4 were provided on both surfaces of the transparent support. Each of the interlayers B and E had a coating thickness of 0.8 μm after drying.

The composition of the coating solution B-4 is as follows.

(Coating Solution B-4)

| | |
|---|---|
| Aqueous solution of polyester resin<br>(PLAS COAT Z592, solid content: 25%,<br>manufactured by GOO CHEMICAL CO., LTD.,) | 155.5 parts by mass |
| Aqueous dispersion of polyurethane resin<br>(SUPERFLEX 150HS, solid content: 38%<br>manufactured by DAI-ICHI KOGYO SEIYAKU<br>CO., LTD.) | 102.2 parts by mass |
| Cross-linking agent (oxazoline compound)<br>(EPOCROS K-2020E, solid content: 40%,<br>manufactured by NIPPON SHOKUBAI CO.,<br>LTD.) | 30.8 parts by mass |
| Surfactant A<br>(1% aqueous solution of NAROACTY CL-95<br>(manufactured by Sanyo Chemical Industries,<br>Ltd.)) | 12.3 parts by mass |
| Surfactant B<br>(1% aqueous solution of RAPISOL B-90<br>(manufactured by NOF CORPORATION)) | 12.3 parts by mass |
| Lubricant (Carnauba wax dispersion<br>CELLOSOL 524, solid content: 30%,<br>manufactured by CHUKYO YUSHI CO., LTD.) | 1.7 parts by mass |
| Preservative (1,2-Benzothiazolin-3-one solid<br>content: 3.5%, methanol solvent, manufactured<br>by DAITO CHEMICAL CO., LTD.) | 0.7 parts by mass |
| Aqueous dispersion of polystyrene latex<br>(Nippol UFN1008, manufactured by ZEON<br>CORPORATION) | 1.0 part by mass |
| Distilled water | α parts by mass |

(α: an amount of distilled water was regulated such that an amount of the coating solution B-4 became 1,000 parts by mass in total.)

An ink receiving layer G was formed on the obtained interlayer B in the same manner as in Example 11, the pressure sensitive adhesive layer H was formed on the obtained interlayer E in the same manner as in Example 11, and a release film was formed on the obtained pressure sensitive adhesive layer H in the same manner as in Example 11, thereby obtaining an ink jet recording sheet of Example 14. Thereafter, a printed material and ornamental glass of Example 14 were obtained in the same manner as in Example 11.

Example 15

A polyethylene terephthalate (hereinafter, abbreviated to "PET") resin, which was polycondensed by using a Ti compound as a catalyst and had an intrinsic viscosity of 0.64, was dried until the moisture content thereof became equal to or less than 50 ppm, and melted in an extruder in which a heater temperature was set to be 270° C. to 300° C. The melted PET was extruded from a die portion onto a chill roll to which static electricity was applied, thereby obtaining a belt-like amorphous base. The obtained belt-like amorphous base was stretched by 3.3-fold in a longitudinal direction and then subjected to a corona discharge treatment in the air, and both surfaces thereof was coated with the following coating solution A-1 by a bar coating method. In a state of being gripped by clips, the coated uniaxially stretched film was guided to a preheating zone and dried at 90° C. Then the film was continuously stretched by 3.8-fold in a width direction in an heating zone of 100° C. and then thermally treated in a heating zone of 215° C., thereby obtaining a laminate having a thickness of 50 μm. The interlayers A and D that were formed by drying the coating solution A-1 had a coating thickness of 0.04 μm after drying.

[Coating Solution A-1]

The coating solution A-1 used in the present example was prepared according to the following method. A reaction container was filled with 95 parts of dimethyl terephthalate, 95 parts of dimethyl isophthalate, 35 parts of ethylene glycol, 145 parts of neopentyl glycol, 0.1 parts of zinc acetate, and 0.1 parts of antimony trioxide, and an ester exchange reaction was performed for 3 hours at 180° C. Thereafter, 6.0 parts of sodium 5-sulfoisophthalate was added thereto, and an esterification reaction was performed for 1 hour at 240° C. Then, a polycondensation reaction was performed for 2 hours at 250° C. under reduced pressure (10 to 0.2 mmHg), thereby obtaining a copolymerized polyester-based resin having a molecular weight of $1.95 \times 10^4$ and a softening point of 60° C. 67 parts of a 30% aqueous dispersion of the obtained copolymerized polyester-based resin (A), 40 parts of a 20% aqueous solution (manufactured by DAI-ICHI KOGYO SEIYAKU CO., LTD., trade name: ELASTRON H-3,) of a self-crosslinking polyurethane resin (B) containing an isocyanate group blocked by sodium bisulfate, 0.5 parts of a catalyst for ELASTRON (manufactured by DAI-ICHI KOGYO SEIYAKU CO., LTD., trade name: Cat 64), 478 parts of water, and 5 parts of isopropyl alcohol were mixed together. To the mixture, 1 part by mass of an anionic surfactant (manufactured by NOF CORPORATION: RAPISOL A-90), 2 parts of a 20% aqueous dispersion of fine particles A (manufactured by NISSAN CHEMICAL INDUSTRIES, LTD: SNOWTEX OL, average particle size: 40 nm), and 0.5 parts of a 4% aqueous dispersion of fine particles B (manufactured by Nippon Aerosil Co. Ltd.; AEROSIL OX-50, average particle size: 500 nm) were added thereto, thereby obtaining the coating solution A-1.

The amorphous base provided with the interlayers A and D formed by drying the obtained coating solution A-1 was transported in a transport rate of 105 m/min, and both surfaces thereof were subjected to a corona discharge treatment under a condition of 955 J/m² and coated with the following coating solution B-5 by a bar coating method. Thereafter, the coating solution B-5 was dried for 1 minute at 145° C., thereby obtaining a laminate in which the interlayers B and E were provided on both surfaces of the support.

Each of the interlayers B and E had a coating thickness of 0.5 μm after drying.

The composition of the coating solution B-5 is as follows.
[Coating Solution B-5)

| | |
|---|---|
| Aqueous solution of polyester resin (PLAS COAT Z592, solid content: 25%, manufactured by GOO CHEMICAL CO., LTD.,) | 16.4 parts by mass |
| Aqueous dispersion of polyurethane resin (SUPERFLEX 150HS, solid content: 38%, manufactured by DAI-ICHI KOGYO SEIYAKU CO., LTD.) | 68.4 parts by mass |
| Aqueous dispersion of acrylic resin (AS-563A manufactured, solid content: 28%, by DAICEL FINECHEM LTD.) | 92.5 parts by mass |
| Cross-linking agent (oxazoline compound) (EPOCROS K-2020E, solid content: 40%, manufactured by NIPPON SHOKUBAI CO., LTD.) | 10.3 parts by mass |
| Surfactant A (1% aqueous solution of NAROACTY CL-95 (manufactured by Sanyo Chemical Industries, Ltd.)) | 29.7 parts by mass |
| Surfactant B (1% aqueous solution of RAPISOL B-90 (manufactured by NOF CORPORATION)) | 12.3 parts by mass |
| Lubricant (Carnauba wax dispersion CELLOSOL 524, solid content: 30%, manufactured by CHUKYO YUSHI CO., LTD.) | 1.7 parts by mass |
| Preservative (1,2-Benzothiazolin-3-one, solid content: 3.5%, methanol solvent, manufactured by DAITO CHEMICAL CO., LTD.) | 0.7 parts by mass |
| Aqueous dispersion of polystyrene latex (Nippol UFN1008, manufactured by ZEON CORPORATION) | 0.7 parts by mass |
| Distilled water | α parts by mass |

(α: an amount of distilled water was regulated such that an amount of the coating solution B-5 became 1,000 parts by mass in total.)

The ink receiving layer G was formed on the obtained interlayer B in the same manner as in Example 11, the pressure sensitive adhesive layer H was formed on the obtained interlayer E in the same manner as in Example 11, and a release film was formed on the obtained pressure sensitive adhesive layer H in the same manner as in Example 11, thereby obtaining an ink jet recording medium of Example 15. Thereafter, a printed material and ornamental glass of Example 15 were obtained in the same manner as in Example 11.

Example 16

A polyethylene terephthalate resin, which was polycondensed using a Ti compound as a catalyst and had an intrinsic viscosity of 0.64, was dried until the moisture content thereof became equal to or less than 50 ppm, and melted in an extruder in which the heater temperature was set to be 270° C. to 300° C. The melted PET was extruded from a die portion onto a chill roll to which static electricity was applied, thereby obtaining a belt-like amorphous base. The obtained belt-like amorphous base was stretched by 3.3-fold in a longitudinal direction and then subjected to a corona discharge treatment in the air, and both surfaces thereof was coated with the following coating solution A-1 by a bar coating method. In a state of being gripped by clips, the coated uniaxially stretched film was guided to a preheating zone and dried at 90° C. Then the film was stretched by 3.8-fold in a width direction in an heating zone of 100° C. and then thermally treated in a heating zone of 215° C., thereby obtaining a laminate having a thickness of 50 μm. Each of the interlayers A and D formed by drying the coating solution A-1 had a coating thickness of 0.04 μm after drying.

The ink receiving layer G was formed on the obtained interlayer A in the same manner as in Example 11, the pressure sensitive adhesive layer H was formed on the obtained interlayer D in the same manner as in Example 1, and a release film was formed on the obtained interlayer H in the same manner as in Example 11, thereby obtaining an ink jet recording sheet of Example 16. Thereafter, a printed material and ornamental glass of Example 16 were obtained in the same manner as in Example 11.

Example 17

A polyethylene terephthalate resin, which was polycondensed using a Sb compound as a catalyst and had an intrinsic viscosity of 0.64, was dried until the moisture content thereof became equal to or less than 50 ppm, and melted in an extruder in which the heater temperature was set to be 270° C. to 300° C. The melted PET was extruded from a die portion onto a chill roll to which static electricity was applied, thereby obtaining a belt-like amorphous base. The obtained amorphous base was stretched by 3.0-fold in a longitudinal direction and then subjected to a corona discharge treatment in the air, and both surfaces thereof was coated with the following coating solution A-2 by a bar coating method. In a state of being gripped by clips, the coated uniaxially stretched film was guided to a preheating zone and dried at 90° C. Then the film was continuously stretched by 4.8-fold in a width direction in an heating zone of 120° C. and then thermally treated in a heating zone of 215° C., thereby obtaining a laminate having a thickness of 50 μm. Each of the interlayers A and D formed by drying the coating solution A-2 had a coating thickness of 0.04 μm after drying.

The composition of the coating solution A-2 is as follows.
[Coating Solution A-2]

| | |
|---|---|
| Aqueous dispersion of polyurethane resin (ELASTRON H-3-DF, solid content: 28%, manufactured by DAI-ICHI KOGYO SEIYAKU CO., LTD.) | 164.9 parts by mass |
| Catalyst for ELASTRON (1% aqueous solution of ELASTRON CAT-21, manufactured by DAI-ICHI KOGYO SEIYAKU CO., LTD.) | 32.5 parts by mass |
| Surfactant (1% aqueous solution of RAPISOL A-90 (manufactured by NOF CORPORATION)) | 41.7 parts by mass |
| Lubricant (3% aqueous solution of carnauba wax CELLOSOL 524-DK, manufactured by CHUKYO YUSHI CO., LTD.) | 48.8 parts by mass |
| pH adjuster (sodium bicarbonate, 5% aqueous solution, manufactured by ASAHI GLASS CO., LTD.) | 3.2 parts by mass |
| Silica particles A (1% dispersion of NIPGEL AZ-204, manufactured by Tosoh Silica Corporation) | 14.9 parts by mass |
| Silica particles B (PL-3-D, solid content: 20%, manufactured by FUSO CHEMICAL CO., LTD.) | 7.4 parts by mass |
| Distilled water | α parts by mass |

(α; an amount of distilled water was regulated such that an amount of the coating solution A-2 became 1,000 parts by mass in total.)

A coating solution G-9 was prepared in the same manner as used for preparing the coating solution G-1, except that the fluorine-based surfactant (GF-1) in the coating solution G-1 of Example 1 was changed to the fluorine-based surfactant (G-2), and the amount thereof was changed to 0.300 parts by mass.

The ink receiving layer G was formed on the obtained interlayer A in the same manner as in Example 1, except that the coating solution G-1 of Example 1 was changed to the coating solution G-9. The pressure sensitive adhesive layer H was formed on the obtained interlayer D in the same manner as in Example 1, and a release film was formed on the obtained pressure sensitive adhesive layer in the same manner as in Example 11, thereby obtaining an ink jet recording sheet of Example 17. Then, a printed material and ornamental glass of Example 17 were obtained in the same manner as in Example 11.

Example 18

A support manufactured in the same manner as in Example 11 was transported in a transport rate of 105 m/min, and one surface thereof was subjected to a corona discharge treatment under a condition of 955 J/m$^2$. Then, one of the surfaces thereof was coated with the coating solution B-1 by a bar coating method, the coating solution B-1 was dried for 1 minute at 145° C., and the coated surface was subjected to a corona discharge treatment under a condition of 288 J/m$^2$. Subsequently, the surface coated with the coating solution B-1 was coated with the coating solution C-1 by a bar coating method. Thereafter, the coating solution B-1 was dried for 1 minute at 145° C., thereby obtaining a laminate in which the interlayer B formed by drying the coating solution B-1 and the interlayer C formed by drying the coating solution C-1 were provided on one surface of the support. Each of the interlayers B and C had a coating thickness of 0.3 μm after drying.

Subsequently, the other surface of the support was subjected to a corona discharge treatment under a condition of 600 J/m$^2$ and then coated with the following coating solution E-1 by a bar coating method. The coating solution E-1 was dried for 1 minute at 145° C., thereby obtaining a laminate in which the interlayer E formed by drying the coating solution E-1 was provided on one surface of the support. The interlayer E had a coating thickness of 0.1 μm after drying.

The composition of the coating solution E-1 is as follows.

[Coating Solution E-1]

| | |
|---|---|
| Acrylic resin binder (EM48D, solid content: 27.5%, manufactured by DAICEL CORPORATION) | 42.6 parts by mass |
| Compound having a plurality of carbodiimide structures (CARBODILITE V-02-L2, solid content: 40%, manufactured by Nisshinbo Chemical Inc.) | 4.8 parts by mass |
| Surfactant A (1% aqueous solution of RAPISOL B-90 (manufactured by NOF CORPORATION), anionic) | 15.8 parts by mass |
| Surfactant B (1% aqueous solution of NAROACTY CL-95 (manufactured by Sanyo Chemical Industries, Ltd.), nonionic) | 15.8 parts by mass |
| Dispersion of fine silica fine particles (aqueous dispersion of AEROSIL OX-50 (manufactured by Nippon Aerosil Co., Ltd.), solid content: 10%) | 1.9 parts by mass |
| Colloidal silica (SNOWTEX XL, solid content: 40.5%, manufactured by NISSAN CHEMICAL INDUSTRIES, LTD) | 0.8 parts by mass |

-continued

| | |
|---|---|
| Lubricant (Carnauba wax dispersion CELLOSOL 524, solid content: 30%, manufactured by CHUKYO YUSHI CO., LTD.) | 1.9 parts by mass |
| Distilled water | Added such that an amount of the coating solution became 1,000 parts by mass in total |

The ink receiving layer G was formed on the obtained interlayer C in the same manner as in Example 11, the pressure sensitive adhesive layer H was formed on the obtained interlayer E in the same manner as in Example 11, and a release film was formed on the obtained pressure sensitive adhesive layer H in the same manner as in Example 11, thereby obtaining an ink jet recording sheet of Example 18. Thereafter, a printed material and ornamental glass of Example 18 were obtained in the same manner as in Example 11.

Example 19

An ink jet recording medium of Example 19 was obtained in the same manner as in Example 1, except that in forming the ink receiving layer of Example 11, the irradiation amount of ultraviolet rays was changed to 148 mJ/cm$^2$ from 77 mJ/cm$^2$. Thereafter, a printed material and ornamental glass of Example 19 were obtained in the same manner as in Example 11.

Example 20

An ink jet recording medium of Example 20 was obtained in the same manner as in Example 15, except that in forming the ink receiving layer of Example 15, the irradiation amount of ultraviolet rays was changed to 148 mJ/cm$^2$ from 77 mJ/cm$^2$. Thereafter, a printed material and ornamental glass of Example 20 were obtained in the same manner as in Example 15.

Example 21

An ink jet recording medium of Example 21 was obtained in the same manner as in Example 11, except that the coating solution H-2 of Example 11 was changed to the following coating solution H-3. Thereafter, a printed material and ornamental glass of Example 21 were obtained in the same manner as in Example 11.

The coating solution H-3 was prepared by the following method. 100 parts by mass of a main agent (manufactured by TOYOCHEM CO., LTD., EG354J), 50 parts by mass of a solvent (ethyl acetate), 0.788 parts by mass of an additive (manufactured by TOYOCHEM CO., LTD., BXX 6342), and 31.5 parts by mass of a curing accelerator (manufactured by TOYOCHEM CO., LTD., BXX 4805) were mixed together for 30 minutes. Thereafter, 18.8 parts by mass of a curing agent (manufactured by TOYOCHEM CO., LTD., BXX 6460) was added thereto, followed by mixing for 30 minutes, thereby obtaining the coating solution H-3.

Example 22

[Composition of Coating Solution G-10]
In the coating solution G-1, the amount of the fluorine-based surfactant (GF-1) was changed to 0.0237 parts by mass.

An ink jet recording sheet of Example 22 was obtained in the same manner as in Example 11, except that in forming the ink receiving layer G of Example 11, the amount of the coating solution G-1 for coating was changed such that the coating thickness of the ink receiving layer G after drying was changed to 28 μm from 5 μm. Thereafter, a printed material and ornamental glass of Example 22 were obtained in the same manner as in Example 11.

Example 23

[Composition of Coating Solution G-11]

In the coating solution G-1, the amount of the fluorine-based surfactant (GF-1) was changed to 0.221 parts by mass.

An ink jet recording sheet of Example 23 was obtained in the same manner as in Example 11, except that in forming the ink receiving layer G of Example 11, the amount of the coating solution G-1 for coating was changed such that the coating thickness of the ink receiving layer G after drying was changed to 3 μm from 5 μm. Thereafter, a printed material and ornamental glass of Example 23 were obtained in the same manner as in Example 11.

Example 24

An ink jet recording medium of Example 24 was obtained in the same manner as in Example 11, except that the coating solution H-2 of Example 11 was changed to the coating solution H-1. Thereafter, a printed material and ornamental glass of Example 24 were obtained in the same manner as in Example 11.

Example 25

An ink jet recording medium of Example 25 was obtained in the same manner as in Example 11, except that the coating solution H-2 of Example 11 was changed to the following coating solution H-4. Thereafter, a printed material and ornamental glass of Example 25 were obtained in the same manner as in Example 11.

The coating solution H-4 was prepared by the following method. 100 parts by mass of a main agent (manufactured by TOYOCHEM CO., LTD., BPS 5296) and 50 parts by mass of a solvent (ethyl acetate) were mixed together for 30 minutes. Thereafter, 0.5 parts by mass of a curing agent (manufactured by TOYOCHEM CO., LTD., BXX 4773) was added thereto, followed by mixing for 30 minutes, thereby obtaining the coating solution H-4.

Example 26

An ink jet recording medium of Example 26 was obtained in the same manner as in Example 11, except that the coating solution H-2 of Example 11 was changed to the following coating solution H-5. Thereafter, a printed material and ornamental glass of Example 26 were obtained in the same manner as in Example 11.

The coating solution H-5 was prepared by the following method. 100 parts by mass of a main agent (manufactured by TOYOCHEM CO., LTD., BPS 5963) and 50 parts by mass of a solvent (ethyl acetate) were mixed together for 30 minutes. Thereafter, 2.0 parts by mass of a curing agent (manufactured by TOYOCHEM CO., LTD., BHS 8515) was added thereto, followed by mixing for 30 minutes, thereby obtaining the coating solution H-5.

Example 27

An ink jet recording sheet of Example 27 was obtained in the same manner as in Example 11, except that the coating solution H-2 of Example 11 was changed to the following coating solution H-6. Thereafter, a printed material and ornamental glass of Example 27 were obtained in the same manner as in Example 11.

The coating solution H-6 was prepared by the following method. 100 parts by mass of a main agent (manufactured by TOYOCHEM CO., LTD., BPS 5963) and 50 parts by mass of a solvent (ethyl acetate) were mixed together for 30 minutes. Thereafter, 0.5 parts by mass of a curing agent (manufactured by TOYOCHEM CO., LTD., BXX 4773) was added thereto, followed by mixing for 30 minutes, thereby obtaining the coating solution H-6.

Examples 28 to 34

Ink jet recording media were obtained in the same manner as in Example 1, except that, in Example 1, the ink receiving layer was formed using each of the coating solutions G-12 to G-24 instead of using the coating solution G-1.

Thereafter, a printed material and ornamental glass of Examples 28 to 34 were obtained in the same manner as in Example 1.

[Coating Solution G-12]

A coating solution G-12 was prepared in the same manner as used for preparing the coating solution G-1, except that the amount of the surfactant GF-1 added was changed to 0.0300 parts by mass.

[Coating Solution G-13]

A coating solution G-13 was prepared in the same manner as used for preparing the coating solution G-5, except that the amount of the surfactant GF-2 added was changed to 0.0300 parts by mass.

[Coating Solution G-14]

A coating solution G-14 was prepared in the same manner as used for preparing the coating solution G-5, except that the amount of the surfactant GF-2 added was changed to 0.241 parts by mass.

[Coating Solution G-15]

A coating solution G-15 was prepared in the same manner as used for preparing the coating solution G-5, except that the amount of the surfactant GF-2 added was changed to 0.600 parts by mass.

[Coating Solution G-16]

A coating solution G-16 was prepared in the same manner as used for preparing the coating solution G-8, except that the amount of the surfactant GF-3 added was changed to 0.600 parts by mass.

[Coating Solution G-17]

A coating solution G-17 was prepared in the same manner as used for preparing the coating solution G-1, except that the surfactant GF-1 was changed to the surfactant GF-4.

[Coating Solution G-18]

A coating solution G-18 was prepared in the same manner as used for preparing the coating solution G-1, except that the surfactant GF-1 was changed to the surfactant GF-4, and the amount thereof added was changed to 0.600 parts.

Comparative Example 1

An ink jet recording medium of Comparative example 1 was obtained in the same manner as in Example 11, except that in Example 11, the ink receiving layer G was not formed.

Thereafter, a printed material and ornamental glass of Comparative example 1 were obtained in the same manner as in Example 11, except that an image portion was formed not on the ink receiving layer G of the ink jet recording medium of Example 11 but on the interlayer C of the ink jet recording sheet of Comparative example 1.

Comparative Example 2

An ink jet recording medium of Comparative example 2 was obtained in the same manner as in Example 11, except that in forming the ink receiving layer G of Example 11, the following coating solution G-19 was used instead of the coating solution G-2, and the ink receiving layer G was formed by the following method.

The composition of the coating solution G-19 is as follows.

[Coating Solution G-19]

| | |
|---|---|
| Aqueous acetic acid solution (1% aqueous solution of industrial acetic acid, manufactured by DAICEL CORPORATION) | 402.0 parts by mass |
| 3-Glycidoxypropyl triethoxysilane (KBE-403, manufactured by Shin-Etsu Chemical Co., Ltd.) | 110.0 parts by mass |
| Tetraethoxysilane (KBE-04, manufactured by Shin-Etsu Chemical Co., Ltd.) | 127.6 parts by mass |
| Curing agent (ALUMICHELATE A (W), manufactured by Kawaken Fine Chemicals Co., Ltd.) | 1.3 parts by mass |
| Surfactant C (10% aqueous solution of SANDEDDO BL (manufactured by Sanyo Chemical Industries, Ltd.), anionic) | 14.7 parts by mass |
| Surfactant A (1% aqueous solution of NAROACTY CL-95 (manufactured by Sanyo Chemical Industries, Ltd.), nonionic) | 40.9 parts by mass |
| Distilled water | α parts by mass |

(α: regulated such that an amount of the coating solution G-19 became 1,000 parts by mass in total)

The coating solution G-19 was prepared by the following method.

An aqueous acetic acid solution was vigorously stirred in a thermostatic bath at 25° C., and in this state, 3-glycidoxypropyl triethoxysilane was added dropwise thereto for 3 minutes. After being stirred for 1 hour, the aqueous acetic acid solution was continuously vigorously stirred in a thermostatic bath at 30° C., and in this state, tetraethoxysilane was added thereto for 5 minutes. Thereafter, the aqueous acetic acid solution was continuously stirred for 2 hours, and then cooled to 10° C. for 1 hour. The aqueous solution obtained in this way was named an aqueous solution X.

Subsequently, a curing agent, a surfactant, and distilled water were added thereto, and the resultant was dispersed for 5 minutes by ultrasonic waves. The liquid obtained in this way was named an aqueous solution Y. The aqueous solution Y was added to the aqueous solution X and then cooled to 10° C.

The interlayer C was subjected to a corona discharge treatment under a condition of 200 J/m² and then coated with the coating solution G-18 by a bar coating method. The coating amount was controlled to become 13.8 cm³/m², and the coating solution was dried for 1 minute at 145° C.

In this way, an ink receiving layer G having an average film thickness of about 0.85 μm was formed.

Thereafter, a printed material and ornamental glass of Comparative example 2 were obtained in the same manner as in Example 11, except that the ink jet recording medium of Comparative example 2 was used.

Comparative Example 3

An ink jet recording medium of Comparative example 3 was obtained in the same manner as in Example 14, except that in Example 14, the interlayer B was formed using the following coating solution B-6 instead of the coating solution B-4, and the ink receiving layer G was not formed.

The composition of the coating solution B-6 is as follows.

[Coating Solution B-6]

| | |
|---|---|
| Aqueous solution of polyester resin (PLAS COAT Z592, solid content: 25%, manufactured by GOO CHEMICAL CO., LTD.) | 155.5 parts by mass |
| Aqueous dispersion of polyurethane resin (SUPERFLEX 150HS, solid content: 38%, manufactured by DAI-ICHI KOGYO SEIYAKU CO., LTD.) | 102.2 parts by mass |
| Cross-linking agent (melamine compound) (BECKAMINE M-3, solid content: 80%, manufactured by DIC Corporation) | 14.6 parts by mass |
| Surfactant A (1% aqueous solution of NAROACTY CL-95 (manufactured by Sanyo Chemical Industries, Ltd.)) | 12.3 parts by mass |
| Surfactant B (1% aqueous solution of RAPISOL B-90 (manufactured by NOF CORPORATION)) | 12.3 parts by mass |
| Lubricant (Carnauba wax dispersion CELLOSOL 524, solid content: 30%, manufactured by CHUKYO YUSHI CO., LTD.) | 1.7 parts by mass |
| Preservative (1,2-benzothiazolin-3-one, solid content: 3.5%, methanol solvent, manufactured by DAITO CHEMICAL CO., LTD.) | 0.7 parts by mass |
| Aqueous dispersion of polystyrene latex (Nippol UFN1008, manufactured by ZEON CORPORATION) | 1.0 part by mass |
| Distilled water | α parts by mass |

(α: an amount of distilled water was regulated such that an amount of the coating solution B-6 became 1,000 parts by mass in total.)

Thereafter, a printed material and ornamental glass of Comparative example 3 were obtained in the same manner as in Example 14, except that an image portion was formed not on the ink receiving layer G of ink jet recording medium of Example 14 but on the interlayer B of the ink jet recording sheet of Comparative example 3.

Comparative Examples 4 to 8

Ink jet recording media were obtained in the same manner as in Example 1, except that, in Example 1, the ink receiving layer was formed using each of coating solutions G-20 to G-24 instead of using the coating solution G-1.

Then, printed materials and ornamental glass of Comparative Examples 4 to 8 were obtained in the same manner as in Example 1.

[Coating Solution G-20]

A coating solution G-20 was prepared in the same manner as used for preparing the coating solution G-1, except that the surfactant GF-1 was changed to MEGAFACE 780 (manufactured by DIC Corporation), and the amount thereof added was changed to 0.403 parts by mass.

[Coating Solution G-21]

A coating solution G-21 was prepared in the same manner as used for preparing the coating solution G-2, except that the surfactant GF-1 was changed to MEGAFACE 780 (manufactured by DIC Corporation), and the amount thereof added was changed to 2.00 parts by mass.

[Coating Solution G-22]

A coating solution G-22 was prepared in the same manner as used for preparing the coating solution G-1, except that the surfactant GF-1 was changed to MEGAFACE 784 (manufactured by DIC Corporation), and the amount thereof added was changed to 0.403 parts by mass.

[Coating Solution G-23]

A coating solution G-23 was prepared in the same manner as used for preparing the coating solution G-2, except that the surfactant GF-1 was changed to MEGAFACE 784 (manufactured by DIC Corporation), and the amount thereof added was changed to 2.00 parts by mass.

[Coating Solution G-24]

A coating solution G-24 was prepared in the same manner as used for preparing the coating solution G-1, except that the surfactant GF-1 was not added.

The used surfactants GF-1 to GF-4 have the following structures.

Herein, the subscript of each monomer unit represents a molar ratio (%) of the monomer unit.

The glass transition temperature is a value measured using X-DSC 7000 manufactured by Hitachi High-Tech Science Corporation.

| Name | Structure | Glass transition temperature | Mw (× $10^4$) |
|---|---|---|---|
| GF-1 | —(CH$_2$—CH)$_{90}$—(CH$_2$—CH)$_{10}$— with OCH$_2$(CF$_2$)$_6$H and O-t-Bu ester groups | −33° C. | 2.10 |
| GF-2 | —(CH$_2$—CH)$_{98}$—(CH$_2$—CH)$_{2}$— with O-CH$_2$-(CF$_2$)$_6$—H and OH ester groups | −31° C. | 1.20 |
| GF-3 | —(CH$_2$—CH)$_{91}$—(CH$_2$—CH)$_{9}$— with O-CH$_2$-(CF$_2$)$_6$H and [O—C$_3$H$_6$]$_6$—OH ester groups | −38° C. | 1.20 |
| GF-4 | —(CH$_2$—CH)$_{95}$—(CH$_2$—CH)$_{5}$— with O-CH$_2$-(CF$_2$)$_6$—H and OH ester groups | −7° C. | 1.25 |

GF-1 was synthesized according to the following method.

38.5 parts of 1H,1H,7H-dodecafluoroheptyl acrylate, 1.43 parts of t-butyl acrylate, 1.1 parts of dimethyl 2,2'-azobisisobutyrate, and 30 parts of 2-butanone were added to a reactor including a stirrer and a reflux condenser and heated to 78° C. for 6 hours in a nitrogen atmosphere, and then the reaction was finished. A weight-average molecular weight of the product was 2.1×$10^4$.

GF-2, GF-3, and GF-4 were synthesized by the same method as used for synthesizing the aforementioned fluorine-based surfactant (GF-1).

MEGAFACE F780 and MEGAFACE F784 (manufactured by DIC Corporation) used in comparative examples were both surfactants containing a perfluoroalkyl group. The glass transition temperature of each of the surfactants was −54° C. for MEGAFACE F780 and −57° C. for MEGAFACE F784.

(Evaluation)

The ink jet recording sheets, the printed materials, and the ornamental glass of Examples 1 to 34 and Comparative examples 1 to 8 were evaluated as below. The obtained results are shown in the following Tables 1 to 6.

In the following Tables 1 to 6, PE represents polyester, PU represents polyurethane, and PO represents polyolefin.

<Evaluation of Ink Adhesiveness>

Immediately after a color image, which has not yet been bonded to glass, was printed at a density of 100%, by using a single-edged razor, 11 lines of scratches was made on the image portion of the printed material of each of examples and comparative examples in each of the vertical and horizontal directions so as to form 100 square lattices. Thereafter, a pressure sensitive adhesive tape (cloth pressure sensitive adhesive tape No. 750 manufactured by Nitto Denko CS System Corporation) was bonded thereto. The surface of the tape was then rubbed with a rubber eraser such that the tape was completely attached to the image portion. Subsequently, the tape was peeled back at an angle of 90° with respect to the horizontal plane, and the number of squares peeled off was counted. In this way, the adhesive strength with respect to the ink was evaluated into 5 levels (A to E) described below.

A: No square was peeled off.
B: The number of lattices peeled off was equal to or greater than 1 and less than 5.
C: The number of lattices peeled off was equal to or greater than 5 and less than 15.
D: The number of lattices peeled off was equal to or greater than 15 and less than 30.
E: The number of lattices peeled off was equal to or greater than 30.

A to C are acceptable product levels, and D to E are rejection levels.

<Density Unevenness at the Time of Printing>

In a room painted in black, transmission scattering light was caused to enter the sample, on which a color image was printed at a density of 20%, from a rear surface thereof, and reflection scattering light was caused to enter the same sample from the printing surface side. By visually observing the light, whether the tape or the unevenness of the cut surface shape could be visually recognized was checked.

A: The tape or the unevenness of the cut surface shape could not be visually recognized by none of the transmission scattering light and the reflection scattering light.

B: In a case where the bonding position of the pressure sensitive adhesive tape was ascertained, the tape or the unevenness of the cut surface shape could be visually recognized by the reflection scattering light.

C: In a case where the bonding position of the pressure sensitive adhesive tape was ascertained, the tape or the unevenness of the cut surface shape could be visually recognized by the transmission scattering light.

D: Even if the bonding position of the pressure sensitive adhesive tape was not ascertained, the tape or the unevenness of the cut surface shape could be visually recognized by the reflection scattering light.

E: Even if the bonding position of the pressure sensitive adhesive tape was not ascertained, the tape or the unevenness of the cut surface shape could be visually recognized by the transmission scattering light.

A to C are acceptable levels for practical use. Herein, "in a case where the bonding position is ascertained" means a case where the observer knows that the recording medium is present on the outer circumferential side of the bonding position of the tape in a state where the recording medium is being repeatedly wound, and mainly observes the portion.

<Scratch Resistance (Pencil Hardness)>

After the printed material of each of the examples and comparative examples was bonded to glass, the surface of the ink receiving layer of an image portion and a non-image portion of the ornamental glass of each of the examples and comparative examples was evaluated by the pencil hardness test method specified in JIS K 5600-5-4. In this method, by using a weight weighing 500 g, the surface of ink receiving layer was repeatedly scratched 5 times with pencils with various hardnesses, and the scale of the hardest pencil that did not leave scratches was determined.

At the pencil hardness of B, the glass is scratched when construction is performed on the glass. Therefore, the glass having a pencil hardness of B is not preferable. In order to prevent the glass from being scratched even when the surface thereof is rubbed at the time of performing construction on the glass, the glass having a pencil hardness of equal to or greater than H is preferable, and the glass having a pencil hardness of equal to or greater than 2H is more preferable.

TABLE 1

| | | | Example 1 | Example 2 | Example 3 | Example 4 | Example 5 | Example 6 | Example 7 |
|---|---|---|---|---|---|---|---|---|---|
| Constitution | Ink receiving layer G | Coating solution Polymerizable compound | G-1 Acryl monomer | G-2 Acryl monomer | G-3 Acryl monomer | G-4 Acryl monomer | G-4 Acryl monomer | G-4 Acryl monomer | G-5 Acryl monomer |
| | | Polymerization initiator | Photopolymerization initiator | Photopolymerization initiator | Photopolymerization initiator | Photopolymerization initiator | Photopolymerization initiator | Photopolymerization initiator | Photopolymerization initiator |
| | | Surfactant type | GF-1 | GF-1 | GF-1 | GF-1 | GF-1 | GF-1 | GF-2 |
| | | Amount of solid content of surfactant [g/m²] | 0.0008 | 0.0016 | 0.0024 | 0.0081 | 0.0081 | 0.0081 | 0.0008 |
| | | UV curing condition [mJ/cm²] | 77 | 77 | 77 | 77 | 77 | 77 | 77 |
| | | Thickness [μm] | 5 | 5 | 5 | 5 | 5 | 5 | 5 |
| | Interlayer C | Coating solution | — | — | — | — | — | — | — |
| | | Resin | — | — | — | — | — | — | — |
| | | Thickness [μm] | — | — | — | — | — | — | — |
| | Interlayer B | Coating solution | — | — | — | — | — | — | — |
| | | Resin | — | — | — | — | — | — | — |
| | | Thickness [μm] | — | — | — | — | — | — | — |
| | Interlayer A | Coating solution | — | — | — | — | — | — | — |
| | | Resin | — | — | — | — | — | — | — |
| | | Thickness [μm] | — | — | — | — | — | — | — |
| | Support Interlayer D (A) | Type Coating solution | A4300 | A4300 | A4300 | A4300 | A4300 | A4300 | A4300 |
| | | Resin | — | — | — | — | — | — | — |
| | | Thickness [μm] | — | — | — | — | — | — | — |
| | Interlayer E (B) | Coating solution | — | — | — | — | — | — | — |
| | | Resin | — | — | — | — | — | — | — |
| | | Thickness [μm] | — | — | — | — | — | — | — |
| | Interlayer F (C) | Coating solution resin | — | — | — | — | — | — | — |

TABLE 1-continued

| | | Example 1 | Example 2 | Example 3 | Example 4 | Example 5 | Example 6 | Example 7 |
|---|---|---|---|---|---|---|---|---|
| Pressure sensitive adhesive layer H | Coating solution | H-1 | H-1 | H-1 | H-1 | H-1 | H-1 | H-1 |
| Winding condition | Maximum pressure applied [MPa] | 0.14 | 0.14 | 0.14 | 0.14 | 0.4 | 0.4 | 0.14 |
| | Material of winding core | FRP | FRP | FRP | FRP | FRP | FRP coating | FRP |
| Evaluation | Ink adhesiveness | B | A | A | A | A | A | B |
| | Density unevenness at the time of printing | B | A | A | C | C | A | A |
| | Scratch resistance (pencil hardness) | 2H | 2H | 2H | 2H | 2H | 2H | 2H |

TABLE 2

| Constitution | | | Example 8 | Example 9 | Example 10 | Example 11 | Example 12 | Example 13 | Example 14 |
|---|---|---|---|---|---|---|---|---|---|
| Ink receiving layer G | Coating solution | Polymerizable compound | G-6 | G-7 | G-8 | G-2 | G-2 | G-2 | G-2 |
| | | Polymerization initiator | Acryl monomer | Acryl monomer | Acryl monomer | Acryl monomer | Acryl monomer | Acryl monomer | Acryl monomer |
| | | Surfactant type | Photopolymerization initiator | Photopolymerization initiator | Photopolymerization initiator | Photopolymerization initiator | Photopolymerization initiator | Photopolymerization initiator | Photopolymerization initiator |
| | | Amount of solid content of surfactant [g/m²] | GF-2 | GF-2 | GF-3 | GF-1 | GF-1 | GF-1 | GF-1 |
| | | | 0.0016 | 0.0024 | 0.0008 | 0.0016 | 0.0016 | 0.0016 | 0.0016 |
| | | UV curing condition [mJ/cm²] | 77 | 77 | 77 | 77 | 77 | 77 | 77 |
| | | Thickness [μm] | 5 | 5 | 5 | 5 | 5 | 5 | 5 |
| | Interlayer C | Coating solution | — | — | — | C-1 | C-2 | C-3 | — |
| | | Resin | — | — | — | PE, PU | PE, PU | PE, PU | — |
| | Interlayer B | Coating solution | — | — | — | B-1 | B-2 | B-3 | B-4 |
| | | Resin | — | — | — | Acryl, PO | Acryl, PO | PE | PE, PU |
| | | Thickness [μm] | — | — | — | 0.3 | 0.4 | 0.4 | 0.8 |
| | Interlayer A | Coating solution | — | — | — | — | — | — | — |
| | | Resin | — | — | — | — | — | — | — |
| | | Thickness [μm] | — | — | — | — | — | — | — |
| Support | | Type | A4300 | A4300 | A4300 | PET | PET | PET | PET |
| | Interlayer D (A) | Coating solution | — | — | — | — | — | — | — |
| | | Resin | — | — | — | — | — | — | — |
| | | Thickness [μm] | — | — | — | — | — | — | — |
| | Interlayer E (B) | Coating solution | — | — | — | B-1 | B-2 | B-3 | B4 |
| | | Resin | — | — | — | Acryl, PO | Acryl, PO | PE | PE, PU |
| | | Thickness [μm] | — | — | — | 0.3 | 0.4 | 0.4 | 0.8 |
| | Interlayer F (C) | Coating solution | — | — | — | C-1 | C-2 | C-3 | — |
| | | resin | — | — | — | PE, PU | PE, PU | PE, PU | — |

TABLE 2-continued

| | | Example 8 | Example 9 | Example 10 | Example 11 | Example 12 | Example 13 | Example 14 |
|---|---|---|---|---|---|---|---|---|
| Pressure sensitive adhesive layer H | Coating solution | H-1 | H-1 | H-1 | H-2 | H-2 | H-2 | H-2 |
| Winding condition | Maximum pressure applied [MPa] | 0.14 | 0.14 | 0.14 | 0.14 | 0.14 | 0.14 | 0.14 |
| | Material of winding core | FRP | FRP | FRP | FRP | FRP | FRP | FRP |
| Evaluation | Ink adhesiveness | B | B | C | A | A | B | C |
| | Density unevenness at the time of printing | A | A | A | A | A | A | A |
| | Scratch resistance (pencil hardness) | 2H | 2H | 2H | 2H | 2H | 2H | 2H |

TABLE 3

| | | | Example 15 | Example 16 | Example 17 | Example 18 | Example 19 | Example 20 | Example 21 |
|---|---|---|---|---|---|---|---|---|---|
| Constitution | Ink receiving layer G | Coating solution Polymerizable compound | G-2 | G-2 | G-9 | G-2 | G-2 | G-2 | G-2 |
| | | Polymerization initiator | Acryl monomer | Acryl monomer | Acryl monomer | Acryl monomer | Acryl monomer | Acryl monomer | Acryl monomer |
| | | Surfactant type | Photopolymerization initiator | Photopolymerization initiator | Photopolymerization initiator | Photopolymerization initiator | Photopolymerization initiator | Photopolymerization initiator | Photopolymerization initiator |
| | | | GF-1 | GF-1 | GF-2 | GF-1 | GF-1 | GF-1 | GF-1 |
| | | Amount of solid content of surfactant [g/m²] | 0.0016 | 0.0016 | 0.0040 | 0.0016 | 0.0016 | 0.0016 | 0.0016 |
| | | UV curing condition [mJ/cm²] | 77 | 77 | 77 | 77 | 148 | 148 | 77 |
| | | Thickness [µm] | 5 | 5 | 5 | 5 | 5 | 5 | 5 |
| | Interlayer C | Coating solution | — | — | — | C-1 | C-1 | — | C-1 |
| | | Resin | B-5 | — | — | PE, PU B-1 | PE, PU B-1 | — | PE, PU B-1 |
| | Interlayer B | Coating solution Resin | PE, PU, acryl | — | — | Acryl, PO | Acryl, PO | B-5 | Acryl, PO |
| | | Thickness [µm] | 0.5 | — | — | 0.3 | 0.3 | 0.5 | 0.3 |
| | Interlayer A | Coating solution | A-1 | A-1 | A-2 | — | — | A-1 | — |
| | | Resin | PE, PU | PE, PU | PU | — | — | PE, PU | — |
| | | Thickness [µm] | 0.04 | 0.04 | 0.04 | — | — | 0.04 | — |
| | Support | Type | PET | PET | PET | PET | PET | PET | PET |
| | Interlayer D (A) | Coating solution | A-1 | A-1 | A-2 | — | — | A-1 | — |
| | | Resin | PE, PU | PE, PU | PU | — | — | PE, PU | — |
| | | Thickness [µm] | 0.04 | 0.04 | 0.04 | — | — | 0.04 | — |
| | Interlayer E (B) | Coating solution Resin | B-5 | — | — | E-1 | B-1 | B-5 | B-1 |
| | | Resin | PE, PU, acryl | — | — | Acryl | Acryl, PO | PE, PU, acryl | Acryl, PO |
| | | Thickness [µm] | 0.5 | — | — | 0.1 | 0.3 | 0.5 | 0.3 |
| | Interlayer F (C) | Coating solution | — | — | — | — | C-1 | — | C-1 |
| | | resin | — | — | — | — | PE, PU | — | PE, PU |

TABLE 3-continued

| | | Example 15 | Example 16 | Example 17 | Example 18 | Example 19 | Example 20 | Example 21 |
|---|---|---|---|---|---|---|---|---|
| Pressure sensitive adhesive layer H | Coating solution | H-2 | H-2 | H-2 | H-2 | H-2 | H-2 | H-3 |
| Winding condition | Maximum pressure applied [MPa] | 0.14 | 0.14 | 0.14 | 0.14 | 0.14 | 0.14 | 0.14 |
| | Material of winding core | FRP | FRP | FRP | FRP | FRP | FRP | FRP |
| Evaluation | Ink adhesiveness | A | B | A | A | B | B | A |
| | Density unevenness at the time of printing | A | A | A | A | A | A | A |
| | Scratch resistance (pencil hardness) | 2H | 2H | 2H | 2H | 2H | 2H | 2H |

TABLE 4

| | | | Example 22 | Example 23 | Example 24 | Example 25 | Example 26 | Example 27 | Example 28 |
|---|---|---|---|---|---|---|---|---|---|
| Constitution | Ink receiving layer G | Coating solution Polymerizable compound | G-10 Acryl monomer | G-11 Acryl monomer | G-2 Acryl monomer | G-2 Acryl monomer | G-2 Acryl monomer | G-2 Acryl monomer | G-12 Acryl monomer |
| | | Polymerization initiator | Photopolymerization initiator | Photopolymerization initiator | Photopolymerization initiator | Photopolymerization initiator | Photopolymerization initiator | Photopolymerization initiator | Photopolymerization initiator |
| | | Surfactant type | GF-1 | GF-1 | GF-1 | GF-1 | GF-1 | GF-1 | GF-1 |
| | | Amount of solid content of surfactant [g/m²] | 0.0016 | 0.0016 | 0.0016 | 0.0016 | 0.0016 | 0.0016 | 0.0004 |
| | | UV curing condition [mJ/cm²] | 77 | 77 | 77 | 77 | 77 | 77 | 77 |
| | | Thickness [µm] | 28 | 3 | 5 | 5 | 5 | 5 | 5 |
| | Interlayer C | Coating solution | C-1 | C-1 | C-1 | C-1 | C-1 | C-1 | — |
| | | Resin | PE, PU | PE, PU | PE, PU | PE, PU | PE, PU | PE, PU | — |
| | | | B-1 | B-1 | B-1 | B-1 | B-1 | B-1 | |
| | Interlayer B | Coating solution | Acryl, PO | Acryl, PO | Acryl, PO | Acryl, PO | Acryl, PO | Acryl, PO | — |
| | | Resin Thickness [µm] | 0.3 | 0.3 | 0.3 | 0.3 | 0.3 | 0.3 | |
| | Interlayer A | Coating solution | — | — | — | — | — | — | — |
| | | Resin | — | — | — | — | — | — | — |
| | | Thickness [µm] | — | — | — | — | — | — | — |
| | Support | Type | PET | PET | PET | PET | PET | PET | A4300 |
| | Interlayer D (A) | Coating solution | — | — | — | — | — | — | — |
| | | Resin Thickness [µm] | — | — | — | — | — | — | — |
| | Interlayer E (B) | Coating solution | B-1 | B-1 | B-1 | B-1 | B-1 | B-1 | — |
| | | Resin | Acryl, PO | Acryl, PO | Acryl, PO | Acryl, PO | Acryl, PO | Acryl, PO | — |
| | | Thickness [µm] | 0.3 | 0.3 | 0.3 | 0.3 | 0.3 | 0.3 | |
| | Interlayer F (C) | Coating solution | C-1 | C-1 | C-1 | C-1 | C-1 | C-1 | — |
| | | resin | PE, PU | PE, PU | PE, PU | PE, PU | PE, PU | PE, PU | — |

TABLE 4-continued

| | | Example 22 | Example 23 | Example 24 | Example 25 | Example 26 | Example 27 | Example 28 |
|---|---|---|---|---|---|---|---|---|
| | Pressure sensitive adhesive layer H | H-2 | H-2 | H-1 | H-4 | H-5 | H-6 | H-1 |
| | Winding condition | | | | | | | |
| | Maximum pressure applied [MPa] | 0.14 | 0.14 | 0.14 | 0.14 | 0.14 | 0.14 | 0.14 |
| | Material of winding core | FRP | FRP | FRP | FRP | FRP | FRP | FRP |
| Evaluation | Ink adhesiveness | A | A | A | A | A | A | C |
| | Density unevenness at the time of printing | A | A | A | A | A | A | A |
| | Scratch resistance (pencil hardness) | 2H | H | 2H | 2H | H | H | 2H |

TABLE 5

| | | | Example 29 | Example 30 | Example 31 |
|---|---|---|---|---|---|
| Constitution | Ink receiving layer G | Coating solution | G-13 | G-14 | G-15 |
| | | Polymerizable compound | Acryl monomer | Acryl monomer | Acryl monomer |
| | | Polymerization initiator | Photopolymerization initiator | Photopolymerization initiator | Photopolymerization initiator |
| | | Surfactant type | GF-2 | GF-2 | GF-2 |
| | | Amount of solid content of surfactant [g/m$^2$] | 0.0004 | 0.0032 | 0.0081 |
| | | UV curing condition [mJ/cm$^2$] | 77 | 77 | 77 |
| | | Thickness [μm] | 5 | 5 | 5 |
| | Interlayer C | Coating solution | — | — | — |
| | | Resin | — | — | — |
| | Interlayer B | Coating solution | — | — | — |
| | | Resin | — | — | — |
| | | Thickness [μm] | — | — | — |
| | Interlayer A | Coating solution | — | — | — |
| | | Resin | — | — | — |
| | | Thickness [μm] | — | — | — |
| | Support | Type | A4300 | A4300 | A4300 |
| | Interlayer D (A) | Coating solution | — | — | — |
| | | Resin | — | — | — |
| | | Thickness [μm] | — | — | — |
| | Interlayer E (B) | Coating solution | — | — | — |
| | | Resin | — | — | — |
| | | Thickness [μm] | — | — | — |
| | Interlayer F (C) | Coating solution | — | — | — |
| | | resin | — | — | — |
| | Pressure sensitive adhesive layer H | Coating solution | H-1 | H-1 | H-1 |
| | Winding condition | Maximum pressure applied [MPa] | 0.14 | 0.14 | 0.14 |
| | | Material of winding core | FRP | FRP | FRP |
| Evaluation | Ink adhesiveness | | C | B | B |
| | Density unevenness at the time of printing | | A | A | C |
| | Scratch resistance (pencil hardness) | | 2H | 2H | 2H |

| | | | Example 32 | Example 33 | Example 34 |
|---|---|---|---|---|---|
| Constitution | Ink receiving layer G | Coating solution | G-16 | G-17 | G-18 |
| | | Polymerizable compound | Acryl monomer | Acryl monomer | Acryl monomer |
| | | Polymerization initiator | Photopolymerization initiator | Photopolymerization initiator | Photopolymerization initiator |
| | | Surfactant type | GF-3 | GF-4 | GF-4 |
| | | Amount of solid content of surfactant [g/m$^2$] | 0.0081 | 0.0008 | 0.0081 |

TABLE 5-continued

|  |  |  |  |  |  |
|---|---|---|---|---|---|
|  |  | UV curing condition [mJ/cm$^2$] | 77 | 77 | 77 |
|  |  | Thickness [μm] | 5 | 5 | 5 |
|  | Interlayer C | Coating solution | — | — | — |
|  |  | Resin | — | — | — |
|  | Interlayer B | Coating solution | — | — | — |
|  |  | Resin | — | — | — |
|  |  | Thickness [μm] | — | — | — |
|  | Interlayer A | Coating solution | — | — | — |
|  |  | Resin | — | — | — |
|  |  | Thickness [μm] | — | — | — |
|  | Support | Type | A4300 | A4300 | A4300 |
|  | Interlayer D (A) | Coating solution | — | — | — |
|  |  | Resin | — | — | — |
|  |  | Thickness [μm] | — | — | — |
|  | Interlayer E (B) | Coating solution | — | — | — |
|  |  | Resin | — | — | — |
|  |  | Thickness [μm] | — | — | — |
|  | Interlayer F (C) | Coating solution | — | — | — |
|  |  | resin | — | — | — |
|  | Pressure sensitive adhesive layer H | Coating solution | H-1 | H-1 | H-1 |
|  | Winding condition | Maximum pressure applied [MPa] | 0.14 | 0.14 | 0.14 |
|  |  | Material of winding core | FRP | FRP | FRP |
| Evaluation |  | Ink adhesiveness | C | C | C |
|  |  | Density unevenness at the time of printing | C | C | C |
|  |  | Scratch resistance (pencil hardness) | 2H | 2H | 2H |

TABLE 6

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Constitution | Ink receiving layer G | | | | | | | | |
| | Coating solution | — | G-19 | — | G-20 | G-21 | G-22 | G-23 | G-24 |
| | Polymerizable compound | — | Silanol | — | Acryl monomer | Acryl monomer | Acryl monomer | Acryl monomer | Acryl monomer |
| | Polymerization initiator | — | — | — | Photopolymerization initiator | Photopolymerization initiator | Photopolymerization initiator | Photopolymerization initiator | Photopolymerization initiator |
| | Surfactant type | — | A, C | — | MEGAFAC F780 | MEGAFAC F780 | MEGAFAC F784 | MEGAFAC F784 | — |
| | Amount of solid content of surfactant [g/m²] | — | — | — | 0.0016 | 0.0081 | 0.0016 | 0.0081 | — |
| | UV curing condition [mJ/cm²] | — | N/A (sol-gel) | — | 77 | 77 | 77 | 77 | 77 |
| | Thickness [μm] | — | — | — | 5 | 5 | 5 | 5 | 5 |
| Interlayer C | Coating solution | C-2 | C-1 | — | — | — | — | — | — |
| | Resin | PE, PU | PE, PU | — | — | — | — | — | — |
| Interlayer B | Coating solution | B-1 | B-1 | B-6 | — | — | — | — | — |
| | Resin | Acryl, PO | Acryl, PO | PE, PU | — | — | — | — | — |
| | Thickness [μm] | 0.3 | 0.3 | 0.8 | — | — | — | — | — |
| Interlayer A | Coating solution | — | — | — | — | — | — | — | — |
| | Resin | — | — | — | — | — | — | — | — |
| | Thickness [μm] | — | — | — | — | — | — | — | — |
| Support | Type | PET | PET | PET | A4300 | A4300 | A4300 | A4300 | A4300 |
| Interlayer D (A) | Coating solution | — | — | — | — | — | — | — | — |
| | Resin | — | — | — | — | — | — | — | — |
| | Thickness [μm] | — | — | — | — | — | — | — | — |
| Interlayer E (B) | Coating solution | B-1 | B-1 | B-6 | — | — | — | — | — |
| | Resin | Acryl, PO | Acryl, PO | PE, PU | — | — | — | — | — |
| | Thickness [μm] | 0.3 | 0.3 | 0.8 | — | — | — | — | — |
| Interlayer F (C) | Coating solution | C-2 | C-1 | — | — | — | — | — | — |
| | resin | PE, PU | PE, PU | — | — | — | — | — | — |

TABLE 6-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Pressure sensitive adhesive layer H | Coating solution | H-2 | H-2 | H-2 | H-1 | H-1 | H-1 | H-1 | H-1 |
| Winding condition | Maximum pressure applied [MPa] | — | — | — | 0.14 | 0.14 | 0.14 | 0.14 | 0.14 |
| | Material of winding core | FRP | FRP | FRP | FRP | FRP | FRP | FRP | FRP |
| Evaluation | Ink adhesiveness | A | E | D | D | D | D | D | E |
| | Density unevenness at the time of printing | — | — | — | A | A | A | A | A |
| | Scratch resistance (pencil hardness) | B | 2H | B | 2H | 2H | 2H | 2H | 2H |

EXPLANATION OF REFERENCES

1: support
2: ink receiving layer
3A, 3B, 3C, 3D, 3E, 3F: interlayer
5: pressure sensitive adhesive layer
6: release film
10: ink jet recording medium
11: image portion
20: printed material
21: glass
30: ornamental glass

What is claimed is:

1. An ink jet recording medium comprising:
a support; and
an ink receiving layer on at least one surface of the support,
wherein the ink receiving layer is a cured layer of a composition containing a radical polymerizable compound, a polymerization initiator, and a compound represented by Formula C-1,

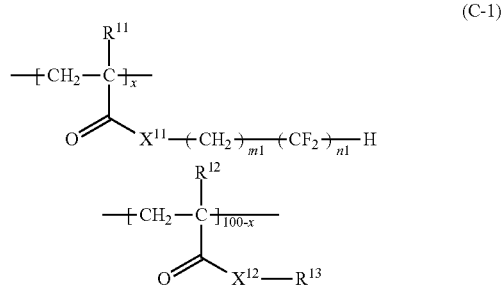

in Formula C-1, $R^{11}$ and $R^{12}$ each independently represent a hydrogen atom or a methyl group, $X^{11}$ and $X^{12}$ each independently represent an oxygen atom, a sulfur atom, or $NR^{14}$, m1 represents an integer of equal to or greater than 1 and equal to or less than 6, n1 represents an integer of equal to or greater than 2 and equal to or less than 20, $R^{13}$ represents a hydrogen atom or an alkyl group having 1 to 30 carbon atoms, $R^{14}$ represents a hydrogen atom or an alkyl group having 1 to 8 carbon atoms, and X represents a molar ratio (%) and is equal to or greater than 20.

2. The ink jet recording medium according to claim 1, further comprising:
a pressure sensitive adhesive layer on a surface of the support that is opposite to the surface having the ink receiving layer.

3. The ink jet recording medium according to claim 2, further comprising:
a single interlayer or plural interlayers between the support and the pressure sensitive adhesive layer.

4. The ink jet recording medium according to claim 1, further comprising:
a single interlayer or plural interlayers between the support and the ink receiving layer.

5. The ink jet recording medium according to claim 3, further comprising:
a single interlayer or plural interlayers between the support and the ink receiving layer.

6. The ink jet recording medium according to claim 1, wherein a content of the compound represented by Formula C-1 in the ink receiving layer is 0.0008 to 0.0081 g/m².

7. The ink jet recording medium according to claim 5, wherein a content of the compound represented by Formula C-1 in the ink receiving layer is 0.0008 to 0.0081 g/m².

8. The ink jet recording medium according to claim 1, wherein a glass transition temperature of the compound represented by Formula C-1 is −50° C. to −10° C.

9. The ink jet recording medium according to claim 7, wherein a glass transition temperature of the compound represented by Formula C-1 is −50° C. to −10° C.

10. The ink jet recording medium according to claim 1, wherein the ink receiving layer is a cured layer obtained by partially curing the composition containing the radical polymerizable compound, the polymerization initiator, and the compound represented by Formula C-1.

11. The ink jet recording medium according to claim 9, wherein the ink receiving layer is a cured layer obtained by partially curing the composition containing the radical polymerizable compound, the polymerization initiator, and the compound represented by Formula C-1.

12. The ink jet recording medium according to claim 11, wherein the polymerization initiator is a photopolymerization initiator.

13. A method for manufacturing an ink jet recording medium, comprising:
an application step of applying a composition, which contains a radical polymerizable compound, a polymerization initiator, and a compound represented by Formula C-1, to at least one surface of a support; and
a curing step of curing the applied composition,

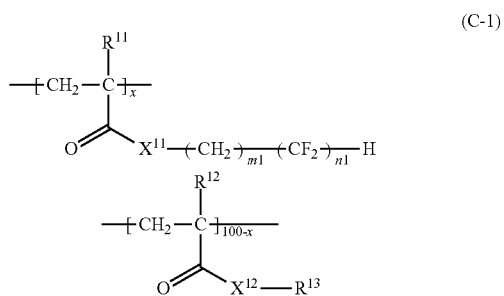

in Formula C-1, $R^{11}$ and $R^{12}$ each independently represent a hydrogen atom or a methyl group, $X^{11}$ and $X^{12}$ each independently represent an oxygen atom, a sulfur atom, or $NR^{14}$, m1 represents an integer of equal to or greater than 1 and equal to or less than 6, n1 represents an integer of equal to or greater than 2 and equal to or less than 20, $R^{13}$ represents a hydrogen atom or an alkyl group having 1 to 20 carbon atoms, $R^{14}$ represents a hydrogen atom or an alkyl group having 1 to 8 carbon atoms, and X represents a molar ratio (%) and is equal to or greater than 20.

14. The method for manufacturing an ink jet recording medium according to claim 13,
wherein in a winding step in the manufacturing method, a maximum pressure applied to the ink jet recording medium is equal to or less than 0.4 MPa.

15. The method for manufacturing an ink jet recording medium according to claim 13,
wherein in a winding step in the manufacturing method, a maximum pressure applied to the ink jet recording medium is equal to or less than 0.8 MPa, and a winding core further has a layer, which allows the ink jet recording medium to absorb a pressure difference, on a surface thereof.

16. The method for manufacturing an ink jet recording medium according to claim 13,
wherein the polymerization initiator is a photopolymerization initiator, and the curing step is a step of curing the composition by irradiating the applied composition with ultraviolet rays.

17. A method for manufacturing a printed material, comprising:
a jetting step of jetting an ink composition onto the ink jet recording medium according to claim 16; and
an image forming step of curing the ink composition by irradiating the jetted ink composition with actinic rays.

18. Ornamental glass comprising:
glass; and
obtained by the method for manufacturing a printed material according to claim 17 that is disposed on the glass.

19. A roll comprising:
a winding core; and
the ink jet recording medium according to claim 5 that is wound around the winding core.

20. A roll comprising:
a winding core; and
the ink jet recording medium according to claim 12 that is wound around the winding core.

* * * * *